(12) United States Patent
Kim et al.

(10) Patent No.: US 8,369,235 B2
(45) Date of Patent: Feb. 5, 2013

(54) METHOD OF EXCHANGING MESSAGES AND TRANSMITTING AND RECEIVING DEVICES

(75) Inventors: Taek Soo Kim, Seoul (KR); Duk Ho Cho, Gyeonggi-Do (KR); Tae Hyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 651 days.

(21) Appl. No.: 12/621,926

(22) Filed: Nov. 19, 2009

(65) Prior Publication Data

US 2010/0315964 A1 Dec. 16, 2010

Related U.S. Application Data

(60) Provisional application No. 61/187,282, filed on Jun. 16, 2009.

(30) Foreign Application Priority Data

Aug. 4, 2009 (KR) .................. 10-2009-0071743

(51) Int. Cl.
*H04L 12/26* (2006.01)
(52) U.S. Cl. ......... 370/252; 370/236; 370/389; 370/516
(58) Field of Classification Search .................. 370/236, 370/252, 395.21, 389, 392, 474, 475, 516, 370/517, 519
See application file for complete search history.

(56) References Cited

U.S. PATENT DOCUMENTS

| | | | |
|---|---|---|---|
| 6,801,939 B1 | 10/2004 | Chafe | |
| 7,408,883 B2 * | 8/2008 | Deragon et al. | ............. 370/249 |
| 2004/0063454 A1 | 4/2004 | Sasaki | |
| 2004/0088434 A1 * | 5/2004 | Takabatake | ............. 709/246 |
| 2005/0148314 A1 | 7/2005 | Taglienti et al. | |
| 2005/0254524 A1 | 11/2005 | An | |
| 2007/0109961 A1 | 5/2007 | Liang | |

(Continued)

FOREIGN PATENT DOCUMENTS

| | | |
|---|---|---|
| EP | 1596559 | 11/2005 |
| JP | 2003-0523663 | 8/2003 |

(Continued)

OTHER PUBLICATIONS

Mohan et al. "Drive test based EDGE Radio Network Performance Evaluation", Vehicular technology Conference, 2005. IEEE, vol. 3, Sep. 25, 2005, pp. 1658-1661, XP010878726. Christian Huitema: "Routing in the Internet, the Internet Protocol", Jan. 1, 2000, pp. 38-39, XP002600850.

*Primary Examiner* — Kwang B Yao
*Assistant Examiner* — Nguyen Ngo
(74) *Attorney, Agent, or Firm* — McKenna Long & Aldridge LLP

(57) ABSTRACT

A method of exchanging a round trip time between a transmitting device and a receiving device in a wireless network comprises receiving an echo request command from an audio video control (AVC) layer to a medium access control (MAC) layer, the echo request command including a first identifier for identifying the transmitting device, a second identifier for identifying the receiving device, and a third identifier; transferring a MAC message from the MAC layer to a physical layer, the MAC message including a message preamble, a message type, and the echo request command; transmitting a first physical layer data unit to the receiving device, the first physical layer data unit including at least one header, the MAC message, and audio/video (A/V) data; and receiving a second physical layer data unit from the receiving device, the second physical layer data unit including an echo report command in response to the echo request command, the echo report command including the third identifier.

16 Claims, 36 Drawing Sheets

U.S. PATENT DOCUMENTS

| | | |
|---|---|---|
| 2008/0031136 A1* | 2/2008 | Gavette et al. ............... 370/235 |
| 2008/0049633 A1* | 2/2008 | Edwards et al. ............ 370/252 |
| 2008/0056154 A1 | 3/2008 | Firestone et al. |
| 2008/0068152 A1 | 3/2008 | Igoe |
| 2008/0101253 A1 | 5/2008 | Shvodian |
| 2008/0134005 A1 | 6/2008 | Izzat et al. |
| 2008/0144553 A1* | 6/2008 | Shao et al. ................... 370/310 |
| 2008/0220767 A1 | 9/2008 | Aretz et al. |
| 2008/0244679 A1 | 10/2008 | Sukumar et al. |
| 2008/0320539 A1 | 12/2008 | Ohkita |
| 2009/0051765 A1 | 2/2009 | Moberly |
| 2009/0225669 A1 | 9/2009 | Qin et al. |
| 2009/0241147 A1* | 9/2009 | Kim et al. ...................... 725/62 |
| 2009/0271530 A1* | 10/2009 | Ohkita ............................. 710/3 |
| 2009/0310574 A1* | 12/2009 | Jeon et al. .................... 370/336 |
| 2010/0020770 A1* | 1/2010 | Qin et al. ...................... 370/336 |

FOREIGN PATENT DOCUMENTS

| | | |
|---|---|---|
| JP | 2008-219311 A | 9/2008 |
| KR | 10-0782837 B1 | 12/2007 |
| KR | 10-0846800 | 7/2008 |
| KR | 10-2009-0057964 | 6/2009 |
| WO | WO 2008/072910 | 6/2008 |

* cited by examiner

In Blocks : B0, B1, B2, B3, B4, ...
Out Blocks : B0, B16, B32, B48, B64, ..., B1, B17, B33, B49, B65, ..., B2, B18, B34, B50, B66, ...

FIG. 13

| Block Processing | Block Type | Quantization | Rate Adjustment |
|---|---|---|---|
| 1 bit | 1 bit | $N_{bits\_per\_block}$ bits | 0 - 1 bits |

FIG.27

| Size | 2 bytes | 2 bytes | 1 byte | 1-254 bytes | 2 bytes |
|---|---|---|---|---|---|
| | Message Preamble | Type | Length | message Body | MCS |

METHOD OF EXCHANGING MESSAGES AND TRANSMITTING AND RECEIVING DEVICES

Pursuant to 35 U.S.C. §119(a), this application claims the benefit of earlier filing date and right of priority to Korean Application No. 10-2009-0071743, filed on Aug. 4, 2009, and pursuant to 35 U.S.C. §119(e), this application further claims benefit of priority from provisional patent application 61/187, 282, filed Jun. 16, 2009. The contents of such applications are hereby incorporated by reference herein in their entirety

BACKGROUND OF THE INVENTION

1. Field of the Invention

The present invention relates to a method of exchanging messages and transmitting and receiving devices, and more particularly, to a method of exchanging messages between devices in a wireless network and transmitting and receiving devices for the same.

2. Discussion of the Related Art

Recently, with the development of communication, computer, and network technologies, many kinds of networks have been developed and used for actual life. Examples of the network include a large-scaled network, such as wire or wireless Internet, which connects the whole world, and a small-scaled wire or wireless network that connects home appliances with one another within a limited place such as general homes or companies. With a variety of network types, various interfacing technologies that allow communication between networks or between devices by connecting them with each other have been developed.

FIG. 1 is a brief diagram illustrating an example of a wireless video access network (WVAN) which is a kind of a wireless private access network (WPAN).

The WVAN is a wireless network that can support uncompressed transmission of 1080P A/V streams by configuring wireless networks between digital devices within a limited space of 10 m or less such as home to obtain throughput of 4.5 Gbps or greater with a bandwidth of about 7 GHz. In this respect, the WVAN is a network configured between personal devices within a limited space. In this way, by configuring a network through direct communication between devices, information can be exchanged between applications without seamlessness.

Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

A high-capacity video bus uses a high-speed digital signal transmission mode of 1 Gbps or greater to transmit audio data of HD screen of 1080p or greater and high quality. However, since such a high-capacity video bus is transmitted through a specific cable connected between devices, a demand of a user who desires to transmit data of a high-speed A/V bus in real-time and a wireless mode is being increased. In case of data transmission of a high-speed A/V bus in a wireless mode, it is advantageous in that the number of cables can be reduced and there is no distance limitation between devices. However, in case of WLAN(IEEE802.11), since A/V data and other data are all processed as general data by a physical layer system, there is difficulty in transmitting data of a high-speed A/V bus in a wireless mode. For this reason, an efficient test for performance of a wireless routing path is required for A/V data transmission in a wireless network.

SUMMARY OF THE INVENTION

Accordingly, the present invention is directed to a method of exchanging messages and transmitting and receiving devices, which substantially obviate ones or more problems due to limitations and disadvantages of the related art.

An object of the present invention is to provide a method of performing a performance test of a wireless routing path by performing a round trip time (RTT) test through specific message exchange between user devices.

Another object of the present invention is to provide a method of reducing message loss caused by throughput overflow by coordinating a message transmission interval based on prediction of maximum transmission capacity of a wireless routing path between user devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to a first aspect of the present invention, a method of exchanging a round trip time between a transmitting device and a receiving device in a wireless network comprises receiving an echo request command from an audio video control (AVC) layer to a medium access control (MAC) layer, the echo request command including a first identifier for identifying the transmitting device, a second identifier for identifying the receiving device, and a third identifier; transferring a MAC message from the MAC layer to a physical layer, the MAC message including a message preamble, a message type, and the echo request command; transmitting a first physical layer data unit to the receiving device, the first physical layer data unit including at least one header, the MAC message, and audio/video (A/V) data; and receiving a second physical layer data unit from the receiving device, the second physical layer data unit including an echo report command in response to the echo request command, the echo report command including the third identifier.

The MAC message is multiplexed with the A/V data in the physical layer. The at least one header includes a basic header and an extended header, and the MAC message is included in the extended header. The MAC message includes a cyclic redundancy check (CRC) code added from the MAC layer to detect an error from the receiving device.

The message type included in the MAC message indicates that the echo request command is an AVC command.

Preferably, the first physical layer data unit is a downlink physical layer data unit (DLPDU), and the second physical layer data unit is an uplink control physical layer data unit (ULCPDU).

Alternatively, the first physical layer data unit is an uplink control physical layer data unit (ULPDU), and the second physical layer data unit is a downlink physical layer data unit (DLPDU).

The at least one header included in the first physical layer data unit includes time information for synchronization and a list of devices constituting the wireless network.

In this case, the first physical layer data unit is transmitted for a time period including a first time period for which the MAC message and the at least one header are transmitted and a second time period for which the A/V data are transmitted. The second physical layer data unit is transmitted for the first time period.

To achieve these objects and other advantages and in accordance with the purpose of the invention, as embodied and broadly described herein, according to one embodiment of a second aspect of the present invention, a transmitting device of a wireless network comprises an AVC layer generating an echo request command including a first identifier for identifying the transmitting device, a second identifier for identifying the receiving device, and a third identifier; a MAC layer generating a MAC message including a message preamble, a message type, and the echo request command transferred from the AVC layer; and a physical layer generating a first physical layer data unit and transmitting the same to a receiving device, and receiving a second physical layer data unit from the receiving device, the first physical layer data unit including at least one header, the MAC message, and audio/video (A/V) data and, and the second physical layer data unit including an echo report command in response to the echo request command, the echo report command including the third identifier.

The physical layer multiplexes the MAC message with the A/V data. The at least one header includes a basic header and an extended header, and the MAC message is included in the extended header. The MAC layer adds a cyclic redundancy check (CRC) code to the MAC message to detect an error from the receiving device. The message type included in the MAC message indicates that the echo request command is an AVC command.

Preferably, the first physical layer data unit is a downlink physical layer data unit (DLPDU), and the second physical layer data unit is an uplink control physical layer data unit (ULCPDU). Alternatively, the first physical layer data unit is an uplink control physical layer data unit (ULPDU), and the second physical layer data unit is a downlink physical layer data unit (DLPDU).

The at least one header included in the first physical layer data unit includes time information for synchronization and a list of devices constituting the wireless network.

To achieve these objects and other advantages and in accordance with the purpose of the invention, as embodied and broadly described herein, according to another embodiment of the second aspect of the present invention, a transmitting device of a wireless network comprises a receiving module receiving a broadcasting signal; a decoding module decoding the broadcasting signal received by the receiving module; a display module displaying contents according to the broadcasting signal decoded by the decoding module; a network control module generating a first physical layer data unit including a MAC message and transmitting the same to a receiving device, the MAC message including the broadcasting signal received by the receiving module, a message preamble, a message type, and the echo request, and receiving a second physical layer data unit including an echo report command from the receiving device in response to the echo request command and processing the same; and a control module controlling the transmitting device to measure a round trip time between the transmitting device and the receiving device through exchange of the echo request/report messages, store the broadcasting signal received by the receiving module in a local memory device, or play contents stored in the local memory device, the exchange being performed through the network control module. In this case, the echo request command includes a first identifier for identifying the transmitting device, a second identifier for identifying the receiving device, and a third identifier.

To achieve these objects and other advantages and in accordance with the purpose of the invention, as embodied and broadly described herein, according to a third aspect of the present invention, in a method of exchanging a message to measure a round trip time in a receiving device of a wireless network, the round trip time representing that between the receiving device and a transmitting device, the method comprises generating an echo report command in an AVC layer in response to an echo request command transmitted from the transmitting device, the echo report command including an identifier included in the echo request command; configuring a MAC message in a MAC layer and transferring the same to a physical layer, the MAC message including a message preamble, a message type, and the echo report command; and transmitting a physical layer data unit from the physical layer to the transmitting device, the physical layer data unit including at least one header, the MAC message, and audio/video (A/V) data.

To achieve these objects and other advantages and in accordance with the purpose of the invention, as embodied and broadly described herein, according to a fourth aspect of the present invention, receiving device of a wireless network comprises an AVC layer generating an echo report command in response to an echo request command transmitted from a transmitting device, the echo report command including an identifier included in the echo request command; a MAC layer configuring a MAC message and transferring the same to a physical layer, the MAC message including a message preamble, a message type, and the echo report command; and the physical layer generating a physical layer data unit and transmitting the same to the transmitting device, the physical layer data unit including at least one header, the MAC message, and audio/video (A/V) data.

According to the present invention, it is possible to perform efficient message exchange by performing a round trip time (RTT) test through specific message exchange between user devices. In this case, it is possible to transmit and receive a radio signal while reducing message loss by selecting a more efficient wireless routing path between devices in a wireless network.

In addition, as a message transmission interval can be coordinated based on prediction of maximum transmission capacity of a wireless path between user devices, message loss caused by throughput overflow can be reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram illustrating quantization bits produced for each video block in a DLPDU PHY structure of a WHDI active source device;

FIG. 27 is a diagram illustrating a configuration type of a media access control (MAC) message in a WHDI;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The embodiments of the present invention disclose a method of performing a performance test of a wireless routing path for A/V data transmission in a wireless home digital interference (WHDI) network.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

A wireless home digital interface (WHDI) system which is recently being studied is to transmit uncompressed audio and/or vide (A/V) data at a 5 Ghz U-NII bandwidth. In the WHDI system, a PHY layer is responsible for the tasks to process and modulate A/V data considering a human audio-visual characteristic, whereby high-capacity video bus data are converted to wireless data more efficiently. In this case, in order to test wireless performance, a radar sensing scheme having radio signal intensity of 5 Ghz is applied to a receiver. The WHDI requires a technology that can properly test transmission performance of control data or non-A/V data. This is because that functions such as setting of a wireless routing path, setting of a retransmission window, and response performance test of a host system can easily be implemented using the technology.

At least one user device included in the WHDI system includes a source device transmitting A/V data and a sink device receiving A/V data from the source device. In this case, the source device that actually transmits A/V data will be regarded as an active source device. And, the sink device that receives Audio/Video signals includes a passive source does not actually transmit A/V data and additionally connected with the active source device. Each of the devices can be divided into at least three layers depending on its functions. Generally, each of the devices includes a PHY layer, a media access control (MAC) layer, and an AVC layer.

Figure 1:
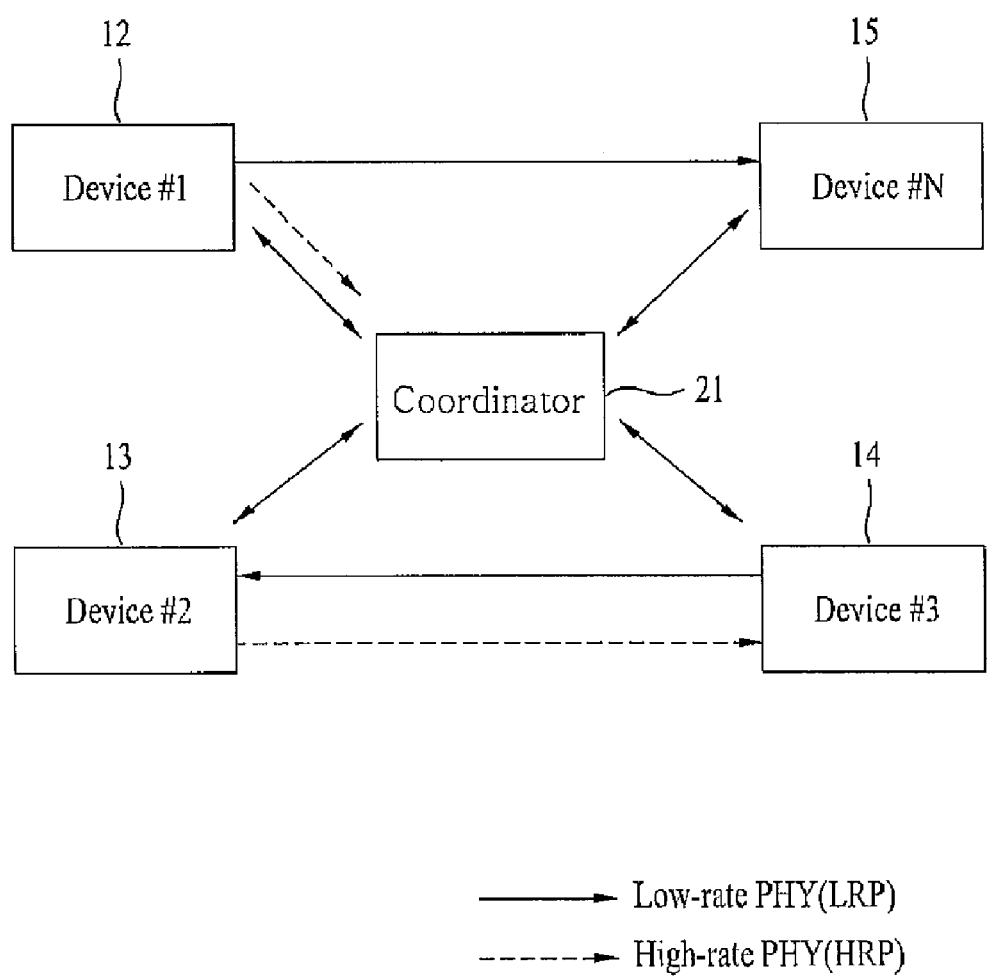
FIG. 1 a brief diagram illustrating an example of user devices constituting WVAN.
Figure 2:
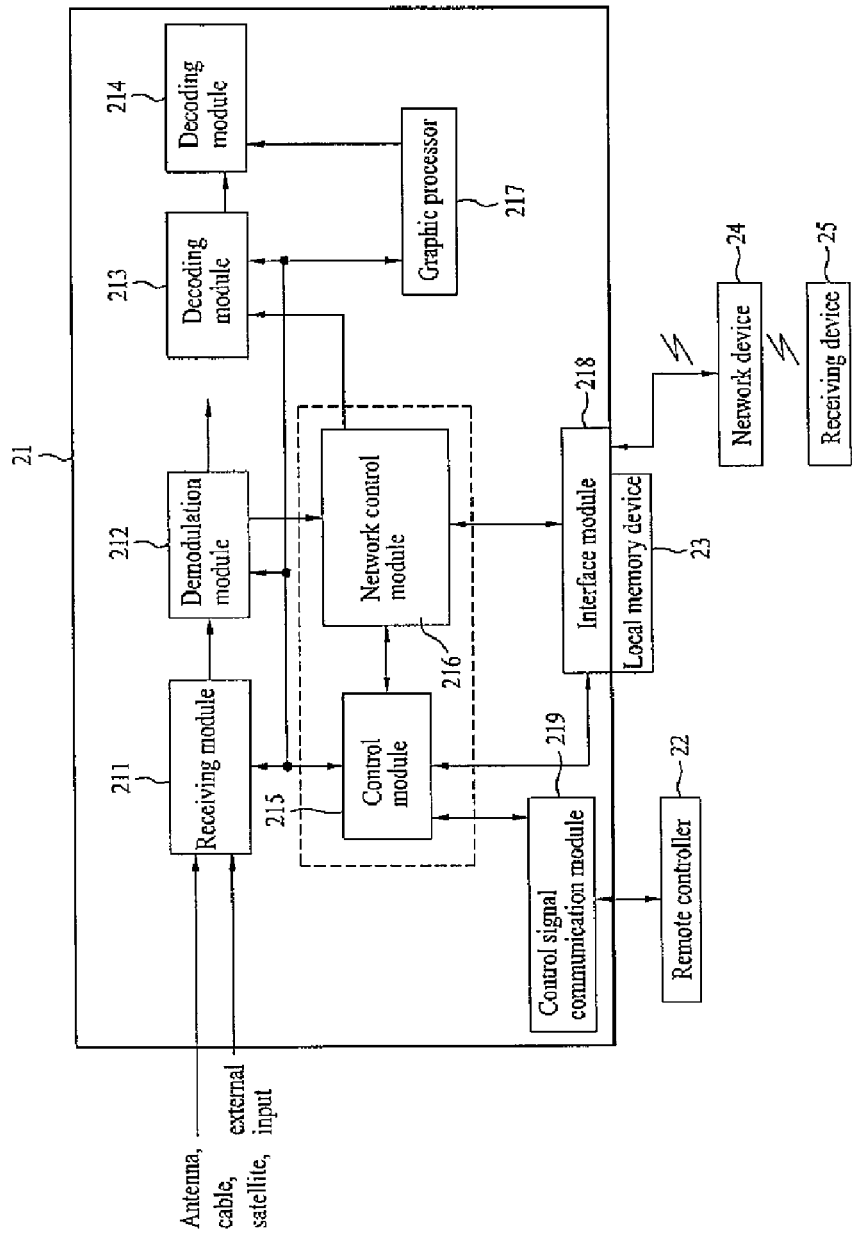
FIG. 2 is a diagram illustrating an embodiment of a broadcasting signal processing system that includes a broadcasting signal receiver as an example of a transmitting device in a wireless home digital interface (WHDI) system.

FIG. 2 is a diagram illustrating an embodiment of a broadcasting signal processing system that includes a broadcasting signal receiver as an example of a transmitting device in a wireless home digital interface (WHDI) network.

The broadcasting signal receiver can play A/V data (hereinafter, referred to as A/V data received through processes which will be described layer) input from a broadcasting station or a cable satellite through an antenna. Also, when the broadcasting signal receiver acts as a transmitting device on the WHDI network, it can remotely transmit the received A/V data to at least one receiving device.

Referring to FIG. 2, the broadcasting signal processing system which is an example of the transmitting device includes a broadcasting signal receiver 21 and a network device 24 that connects the broadcasting signal receiver with a remote memory device or other device 25.

The broadcasting signal receiver 21 includes a receiving module 211, a demodulation module 212, a decoding module 213, a display module 214, a control module 215, a network control module 216, a graphic processor 217, an interface module 218, and a control signal communication module 219. In the example of FIG. 2, the broadcasting signal receiver 21 further includes a local memory device 23 directly connected with the interface module 218 that includes input and output ports. However, the local memory device may be a memory device mounted in the broadcasting signal receiver 21.

The interface module 218 can communicate with the wire/wireless network device 24, and can be connected with at least one receiving device 25 through the network device 24, wherein the at least one receiving device 25 exists on the wireless network. The control signal communication module 219 receives a user control signal in accordance with a user control device, for example, remote controller 22, and outputs the received signal to the control module 215.

The receiving module 211 could be a tuner that receives a broadcasting signal of a specific frequency through at least one of ground wave, satellite, cable, and Internet network. The receiving module 211 may be provided respectively for each of broadcasting sources, for example, ground wave broadcasting, cable broadcasting, satellite broadcasting, and personal broadcasting. Alternatively, the receiving module 211 may be a unified tuner. Also, supposing that the receiving module 211 is a tuner for ground wave broadcasting, at least one digital tuner and at least one analog tuner may be provided respectively, or a digital/analog tuner may be provided.

Furthermore, the receiving module 211 may receive internet protocol (IP) streams transferred through wire and wireless communication. If the receiving module 211 receives IP streams, the receiving module 211 can process transmitting and receiving packets in accordance with an IP protocol that establishes source and destination information for received IP packets and packets transmitted from the broadcasting signal receiver. The receiving module 211 can output video/audio/data streams included in the received IP packets in accordance with the IP protocol, and can generate transport streams to be transmitted to the network as IP packets in accordance with the IP protocol to output them. The receiving module 211 is an element that receives an externally input video signal, and, for example, may receive IEEE 1394 type video/audio signals or HDMI type streams from the outside.

The demodulation module 212 demodulates the input broadcasting signals in an inverse order of a modulation mode. The demodulation module 212 outputs broadcasting streams by demodulating the broadcasting signals. If the receiving module 211 receives stream type signals, for example, IP streams, the IP streams are output to the decoding module 213 after bypassing the demodulation module 212.

The decoding module 213 includes an audio decoder and a video decoder, and decodes the broadcasting streams output from the demodulation module 212 or streams produced through the network control module 216 through their respective algorithms and outputs the decoded streams to the display module 214. At this time, a demultiplexer (not shown) that splits each stream in accordance with a corresponding identifier may additionally be provided between the demodulation module 212 and the decoding module 213. The demultiplxer splits the broadcasting signals into an audio element stream (ES) and a video element stream and outputs them to each decoder of the decoding module 213. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The graphic processor 217 processes a graphic to be displayed so that a menu screen is displayed in a video image displayed by the display module 214, and controls the graphic to be displayed in the display module 214 together with the menu screen.

The interface module 218 can be interfaced with at least one receiving device 25 through a wire and wireless network. Examples of the interface module 218 include Ethernet module, Bluetooth module, short distance wireless Internet module, portable Internet module, home PNA module, IEEE1394 module, PLC module, home RF module, and IrDA module. Meanwhile, the interface module 218 can output a control signal to a remote memory device, wherein the control signal can turn on the power. For example, although not shown in FIG. 2, the interface module 218 can turn on the power of a separate remote memory device by transmitting a WOL signal to a network interface module that performs communication with the remote memory device.

The network control module 216 is operated to transmit the broadcasting signals received by the receiving module 211 together with MAC message through a physical layer data unit when the broadcasting signal receiver 21 illustrated in FIG. 2 transmits the broadcasting signals received therein to another device on the WHDI network. The network control module 216 may directly receive the broadcasting signals from the receiving module 211, or may receive the broadcasting signals demodulated by the demodulation module 212. In case of the former case, an encoding process may be omitted. Also, the broadcasting signals received by the receiving module 211 can be input to the protocol layer module 216 after going through a processing procedure for signal transmission in the control module 215. For example, if a message including the broadcasting signals is received from the receiving device 25, the received message is split into a broadcasting signal and MAC message by the network control module 216. The split broadcasting signal (or broadcasting stream) is input to the decoding module 213, decoded by a decoding algorithm, and output to the display module 214.

The network work control module 216 may be regarded as a second control module different from the control module 215, wherein the second control module controls an AVC layer generating a predetermined audio video control layer (AVCL) command, a MAC layer generating MAC message including the AVCL command transferred from the AVC layer, and a PHY layer generating a first physical layer data unit including the broadcasting signals input from the receiving module 211 or the demodulation module 212 and the MAC message. The first physical layer data unit can be transmitted to another device using the network device 24 through the interface module 218. Also, the network control module 216 can receive a second physical layer data unit including a response message transmitted from the receiving device which has received the AVCL command, wherein the response message is transmitted in response to the AVCL command.

Although the control module 215 and the network control module 216 are provided separately in FIG. 2, these control modules can be implemented by one system chip as illustrated in a dotted part. Specifically, in the protocol layer that includes the AVC layer, the MAC layer and the PHY layer, which are controlled by the network control module 216, the AVC layer and the MAC layer can identify a message to be transmitted or received within the control module 215. At this time, the PHY layer forms a physical layer data block in the network control module 216. The network control module 216 will be described in detail with reference to a structure of the physical layer data block illustrated in FIG. 9 to FIG. 16.

The control module 215 can control the operations of the aforementioned modules (receiving module, demodulation module, decoding module, display module, graphic processor, network control module, and interface module). Also, the control module 215 displays a menu that receives a control command of the user, and drives an application that displays various kinds of information or menu of a broadcasting signal processing system for the user.

For example, the control module 215 can read out contents stored in the local memory device 23 if the local memory device 23 is mounted the broadcasting signal receiver. Also, the control module 215 can control the operation of the local memory device 23 so that the broadcasting contents received from the receiving module 211 are stored in the local memory device 23 if the local memory device 23 is mounted in the broadcasting signal receiver. Furthermore, the control module 215 can output a control signal for mounting the local memory device 23 depending on whether the local memory device 23 has been mounted in the broadcasting signal receiver.

The control module 215 checks remaining memory capacity of the local memory device 23, and allows information of the remaining memory capacity to be displayed for the user on the display module 214 through the graphic processor 217.

The control module 215 can shift the contents stored in the local memory device 23 to the remote memory device if the remaining memory capacity of the local memory device 23 is not sufficient. In this case, the control module 215 can display a menu indicating whether to shift the contents stored in the local memory device to another local memory device (not shown) or the remote memory device through the display module 214. And, the control module 215 can receive and process a user control signal of the menu. Accordingly, the control module 215 can allow the contents stored in the local memory device 23 and other directly or remotely mounted memory device to be shifted between them and stored therein.

The display module 214 displays the broadcasting contents received from the receiving module 211 and the contents stored in the local memory device 23. The control module 214 can display a menu indicating whether the memory device has been mounted in the broadcasting signal receiver and information related to the remaining capacity of the memory device, in accordance with a control command of the control module 215, and can be operated under the control of the user.

Figure 3:
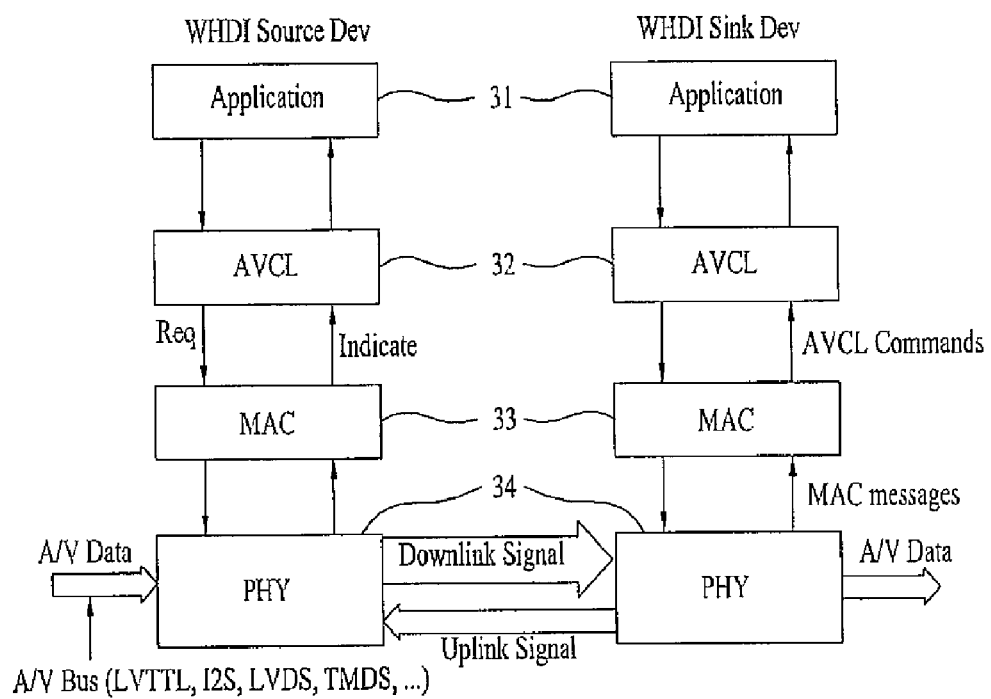
FIG. 3 is a diagram illustrating an example of a protocol layer structure implemented in a device of a WHDI system.

FIG. 3 is a diagram illustrating an example of a protocol layer structure implemented in a device of a WHDI system. The protocol layer structure is implemented in the network control module 216 of FIG. 2.

Referring to FIG. 3, the WHDI system includes four layers.

An application layer 31 which is the uppermost layer is to allow the user to unify WHDI in a host system of the user.

An audio video control layer (AVCL) 32 is an upper layer that takes the role in device control and streaming connection for A/V data transmission between the source device and the sink device. The AVCL is used to allow the sink device to indicate an active source device that desires to receive A/V streams from a specific source device. The sink device may receive and render A/V streams, or may not need to receive A/V streams any more. Meanwhile, in the source device, the AVCL is used to indicate a specific display requested by the user to display contents on the display module of the source device. Also, the AVCL is used to allow the source device to determine receptive capacity related to A/V data of the sink device or transfer meta data related to A/V data. Moreover, the AVCL is used to allow all devices to perform remote device control (RDC) such as play of a display player or control of channel change on a set-top box.

As described above, the AVCL includes two types of control modes of control protocol and meta data transfer. In this case, the control protocol (or AVCL protocol) includes bidirectional command transmission between devices on an active network. Generally, the message including the AVCL command goes through the MAC layer, is mapped with the MAC message, and is transmitted together with other data in the PHY layer. This will be described later.

Next, a media access control (MAC) layer 33 takes the role in link setup, connection or non-connection, and channel access to a lower layer of a material transmission protocol, and also takes the role in reliable data transmission. In other words, the MAC layer 33 serves to transmit a control/data message or control a channel.

The MAC layer implements subcarrier sense or clear channel assessment (CCA) before transmitting packets using carrier sense multiple access with collision avoidance (CSMA/CA) based on ACK frame as a basic channel access scheme. Considering directionality between the source device and the sink device, a wireless communication line is divided into a downlink and an uplink. The downlink is implemented by one long frame, and a recovery process using ACK frame can be skipped in the downlink. Since synchronization between a video frame which is transmitted and a modem (PHY) frame is performed in the downlink, a required transmission time is determined in accordance with a format of A/V data which are transmitted. Generally, a MAC format includes a basic header (BH) and an extended header (EH).

A PHY layer 34 directly processes A/V data and at the same time the A/V data may be processed by the MAC layer 33. In the WHDI, the PHY layer is responsible for the tasks to send and receive the audio and video data which are sampled in the raw. The PHY layer also takes the role to convert the message requested from the upper layers such as the AVCL layer 32 and the MAC layer 33 to the corresponding radio signal, so that the messages can be sent and received between devices by the PHY layer. Also, the PHY Layer has the features including the capability of unidirectional transmission for A/V data and the capability of bidirectional data channel. Moreover, the PHY layer has the features including PHY level encryption of all A/V data and measurement capability for SNR, carrier sense and interference detection.

The PHY Layer accepts/outputs raw video samples in the form of 4:4:4 YCbCr stream of pixels, on the source/sink devices, respectively. The PHY Layer also accepts/outputs raw audio samples in a number of formats, on the source/sink devices, respectively. All conversions into/from these formats are done at the application layer 31 in the source/sink devices, respectively.

Figure 4:
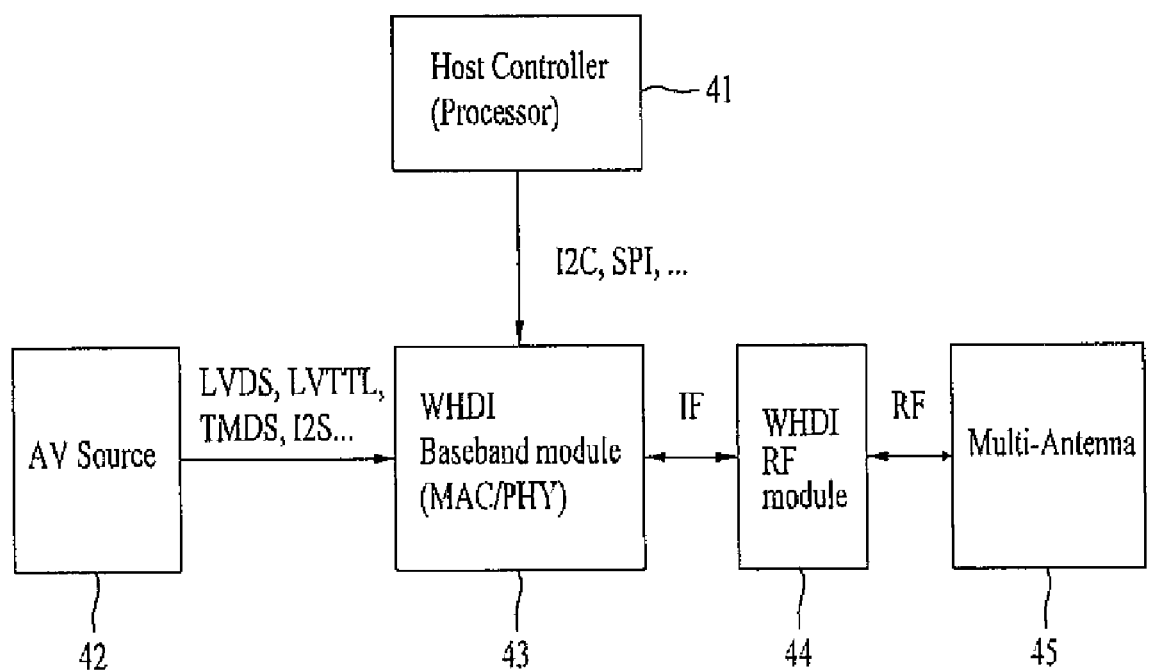
FIG. 4 is a block diagram illustrating an example of a source device in a WHDI system.

FIG. 4 is a block diagram illustrating an example of a source device in a WHDI system.

Referring to FIG. 4, a host controller 41 which is a kind of a processor unifies and manages the whole system, and takes the role to perform the functions of the AVCL or control a WHDI baseband module 43 using an I2C (inter integrated circuit) bus system structure. Since the I2C bus system is operated on an I2C protocol, a plurality of ICs can be connected or communicated with one another through a common bus. The I2C bus system is widely used in a consumer electronic device to provide a method of connecting a central processing unit (CPU) with related peripheral ICs in a television environment (i.e., providing communication between the CP and the peripheral ICs). The I2C system is generally limited to transmit data at a setting clock speed in accordance with a setting protocol, and a main control IC of the I2C system sets a transmission rate or speed (i.e., clock rate or bus speed). Accordingly, all ICs connected with a specific I2C bus should be communicated at the same speed or data transmission rate. The host controller 41 may include a memory therein, or may use an external memory.

The WHDI baseband module 43 takes the role as the aforementioned MAC/PHY layer, and transmits A/V data to a WHDI RF module 44 at an intermediate frequency (IF) by receiving the A/V data from an A/V source device 42 through a bus such as LVDS. The WHDI RF module 44 converts the intermediate frequency (IF) to a carrier signal and transmits the converted microwave signal through a multi-antenna 45. The WHDI RF module 44 can transmit and receive a control signal in addition to the A/V data.

Figure 5:
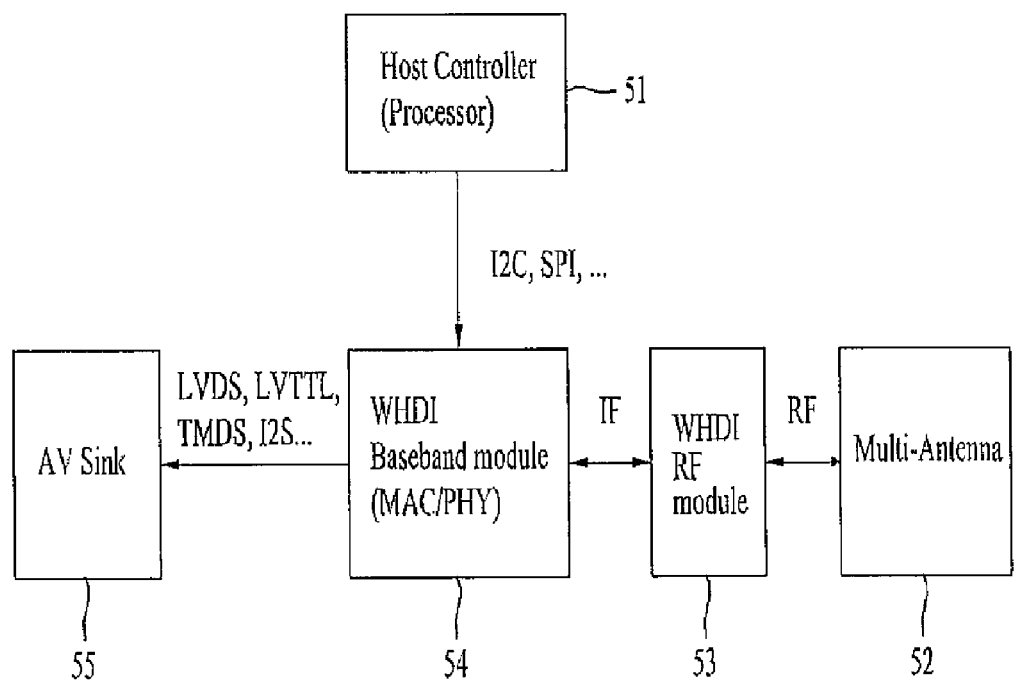
FIG. 5 is a block diagram illustrating an example of a sink device in a WHDI system.

FIG. 5 is a block diagram illustrating an example of a sink device in a WHDI system.

Referring to FIG. 5, like the aforementioned source device, a host controller 51 which is a kind of a processor unifies and manages an application, and takes the role to control a WHDI baseband module 54 using an I2C (inter integrated circuit) bus system structure. A WHDI RF module 53 converts RF signal received from a multi-antenna 52 to an intermediate frequency (IF), and transmits an A/V bus signal such as LVDS and I2S to an A/V sink device 55 by recovering the A/V data transmitted from the source device.

Figure 6:
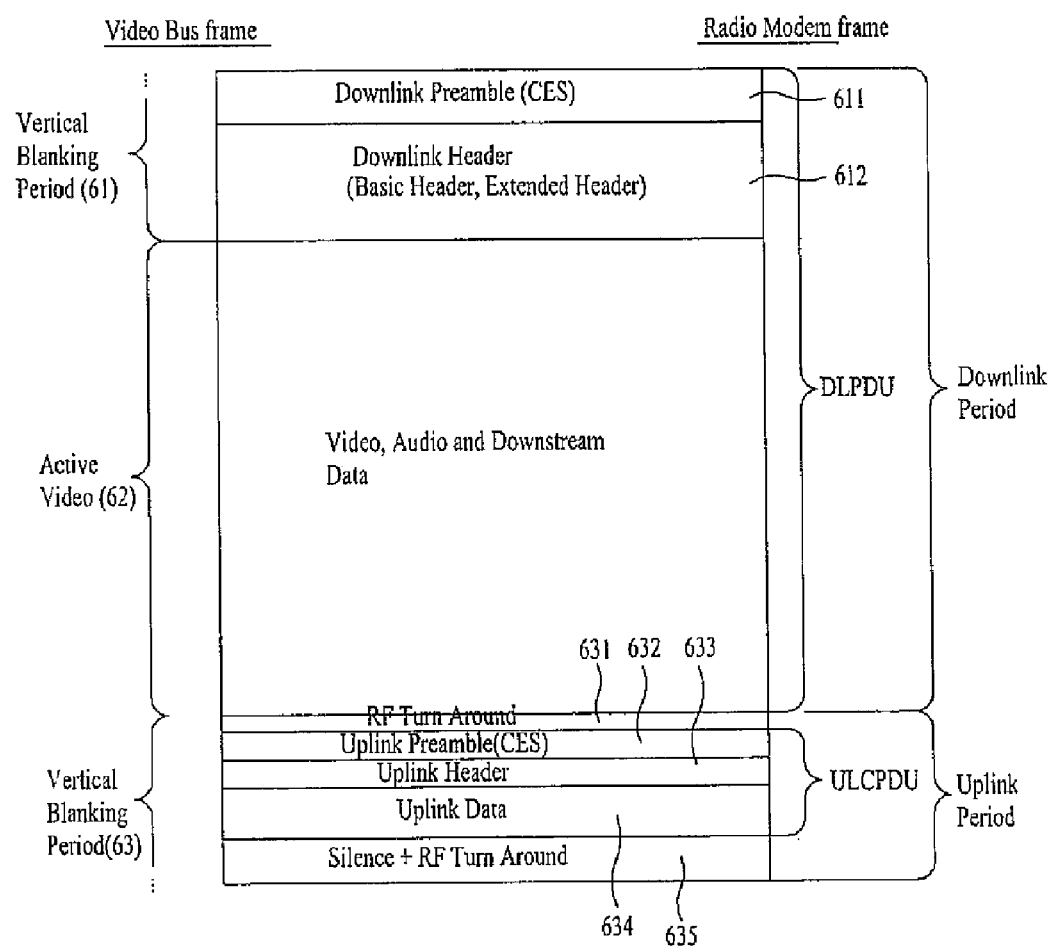
FIG. 6 is a timing flow chart illustrating a process of converting a general video signal including a vertical blanking period into an RF signal in a WHDI device which is transmitting and receiving A/V data.

FIG. 6 is a flow chart illustrating a process of converting a general video signal including a vertical blanking period into an RF signal in a WHDI device which is transmitting and receiving A/V data.

Generally, an interval where a source device continues to transmit a radio signal to a sink device will be referred to as a downlink interval. In the downlink interval, the source device transmits a downlink PHY data unit (DLPDU). The downlink interval can be divided into a vertical blanking period 61 and an active video period 62. First of all, the vertical blanking period 61 is divided into an interval 611 where the source device transmits a downlink preamble including channel estimation sequence (CES) to the sink device and an interval 612 where the source device transmits a downlink header to the sink device. The CES is a scheme that measures distortion of a received signal, which occurs as a transmitting signal passes through an unspecified radio channel, i.e., time delay, phase variation and attenuation by using a pilot signal included in the transmitting signal at a given pattern.

The WHDI source device which is transmitting and receiving A/V data can continue to transmit a control information corresponding to a radio signal and a signal having a bandwidth of 5 Ghz including video data for the downlink interval without seamlessness. The time required for the downlink interval corresponds to the time obtained by adding a part of the vertical blanking period of video bus (component, HDMI, LVTTL, etc.) to one of the active video period where actual video data are transmitted. In other words, the signal transmission time is determined in accordance with a type of data transmitted from the source device. In this case, for the downlink interval, the PHY signal can be transmitted in a unit longer than that of other RF communication as much as 10 ms or greater.

The downlink interval follows after the uplink interval. The uplink interval is an interval where the PHY layer of the sink device can transmit a radio signal to the source device. The uplink interval includes only a part 63 of the vertical blanking period of a video bus (component, HDMI, LVTTL, etc.). An uplink control PHY data unit (ULCPDU) corresponding to the uplink interval is divided into an RF turn around interval 631, an interval 632 for transmitting a preamble including CES, an interval 633 for transmitting an uplink header, an interval 634 for transmitting uplink data, and a silence and RF turn around interval 635.

The interval 632 for transmitting an uplink preamble including CES is a signal interval for synchronization of a device that receives an uplink radio signal. The silence and RF turn around interval 635 corresponds to the time required to convert a transmitting antenna to a receiving antenna or vice versa. Namely, the silence and RF turn around interval 635 is a temporary silence interval, and corresponds to the time required to convert a transmitting mode to a receiving mode in case of the sink device, and the time required to convert the receiving mode to the transmitting mode in case of the source device.

If the uplink interval ends, the preamble/CES transmission interval 611 and the downlink header transmission interval 612 of the downlink interval continue to fill the vertical blanking period 61.

In this way, the WHDI PHY layer which is transmitting A/V data can define the downlink transmission interval in accordance with time interval (i.e., time gap between the vertical blanking period and the active video period) of an original signal (signal of wire bus) of video data which are transmitted. In the downlink and the uplink, OFDM and MIMO technologies are used for each transmission interval.

However, different methods of generating and transmitting a PHY signal are used in the downlink and the uplink.

The source device configures its voice, video and control data through a DLPDU in the PHY layer using the downlink interval of the vertical blanking period 61 and the active video period 62 and then transmits the configured data to the sink device through the radio signal. The downlink interval is divided into a video dependent DLPDU mode for transmitting video data only and a video independent DLPDU mode for transmitting data having no relation with video data. Hereinafter, the video dependent DLPDU mode and the video independent DLPDU mode will be described with reference to FIG. 7 and FIG. 8.

Figure 7:
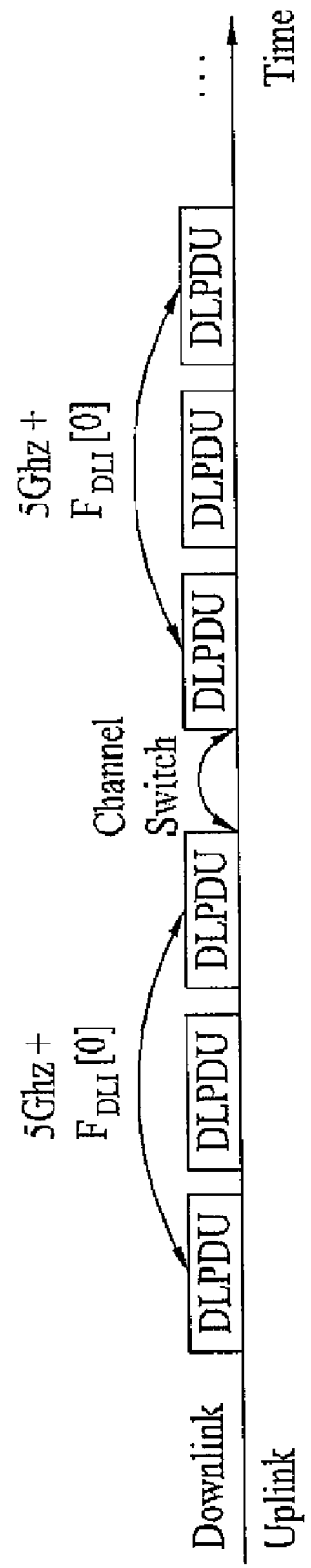
FIG. 7 is a diagram illustrating an example of a DLPDU sequence in case of a video independent DLPDU mode in a WHDI PHY layer.

FIG. 7 is a diagram illustrating an example of a DLPDU sequence in case of a video independent DLPDU mode in a WHDI PHY layer.

Referring to FIG. 7, the source device broadcasts its existence through the video independent DLPDU having no relation with A/V data to seek the sink device when the network starts. The video independent DLPDU is similar to a beacon message but is different from the beacon message in that time information for synchronization or control information such as a device list of the network is carried in the basic header (BH) and the extended header (EH) of the DLPDU so that the time information or the control information can be transmitted simultaneously with another kind of MAC command or AVC command. Another object of the video independent DLPDU is to allocate a short time period required to transmit an audio signal to the sink device. Since the video independent DLPDU does not need to synchronize with a video bus signal, it requires a relatively short time of 5 ms or less.

Referring to FIG. 7, when the source device transmits an independent DLPDU having no A/V data to seek the sink device, frequency $F_{DLI}[0]$ represents each central frequency range within the range of 5 Ghz U-NII. For example, $F_{DLI}[0]$ is 5150 Mhz and $F_{DLI}[1]$ is 5470 Mhz within the range of 5 Ghz U-NII. The source device broadcasts its information over all channels to allow the sink device in a standby mode for reception to respond to the broadcasted information.

Figure 8:
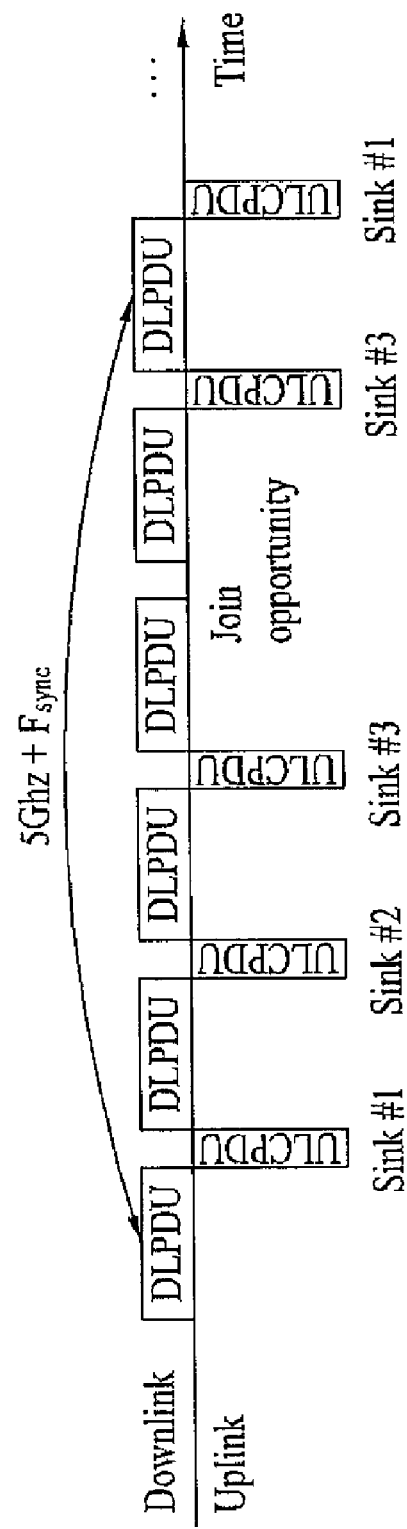
FIG. 8 is a diagram illustrating an example of a DLPDU sequence in case of a video dependent DLPDU mode in WHDI PHY layer.

FIG. 8 is a diagram illustrating an example of a DLPDU sequence in case of a video dependent DLPDU mode in WHDI PHY layer.

Referring to FIG. 8, an object of the video dependent DLPDU is to allow the source device to synchronize its frequency with a video signal prior to a radio signal. For example, if the source device is transmitting a video signal of 1080p 50 hz to the sink device using the downlink, a DLPDU signal is sustained for a time period of about 18 ms corresponding a signal interval when an active video signal, i.e., DE signal is on in the active source device. As illustrated in FIG. 8, if the interval where the first DLPDU is transmitted ends, a direction of a signal is changed and the first sink device transmits uplink control PHY data unit (ULCPDU) data to the source device using the uplink. Afterwards, if the ULCPDU signal is transmitted from the first sink device to the source device, next DLPDU signal is transmitted and the ULCPDU signal is transmitted from the second sink device to the source device. In this way, this process is repeated. Header information of the ULCPDU and the DLPDU is included in the vertical blanking period of the video signal. Namely, the sink device can transmit the PHY signal for a relatively short time of 500 us or less.

Figure 9:
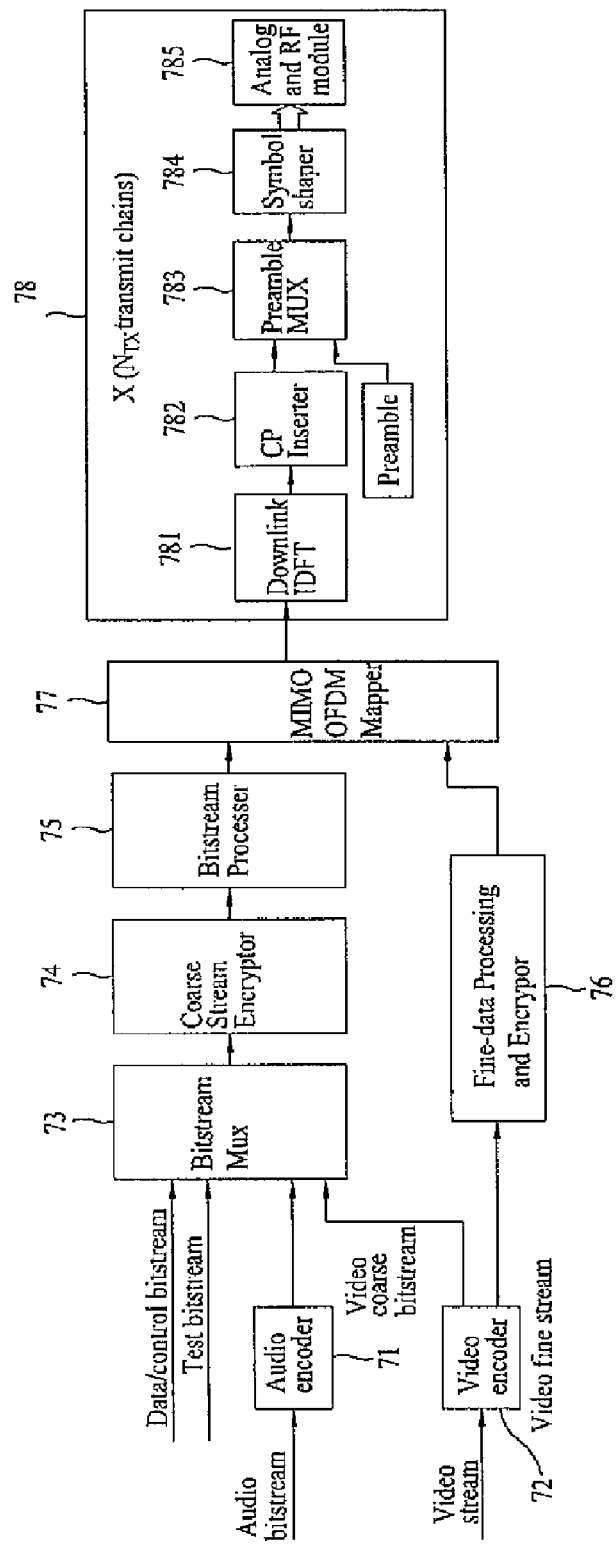
FIG. 9 is a diagram illustrating an example of a PHY structure that transmits a DLPDU in a WHDI system.

Next, FIG. 9 is a diagram illustrating an example of a PHY structure that transmits a DLPDU in a WHDI system.

In a DLPDU PHY structure of a WHDI active source device, a radio encoding process can be implemented in various manners in accordance with a type of data which will be transmitted. Particularly, in case of video data, each frame (for example, each image) is decomposed into one or more color components Y, Cb, Cr, and a frame of the decomposed color components is decomposed into frequency components and then quantized. In this case, an error of the quantized result is split into video fine streams, and the quantized frequency components are split into video coarse bitstreams. A separate channel encoding process is applied to the video fine streams and the video coarse bitstreams even in case of the same video data.

Referring to FIG. 9, data transmitted in the WHDI DLPDU PHY structure are divided into data/control bitstreams which are message command data requested from the MAC layer and the AVCL, test bistreams which are given bit patterns mixed with data by the receiving side to verify signal accuracy, audio bitstreams transmitting audio data, and video bitstreams transmitting video data. The video bitstreams are subdivided into video coarse bitstreams transmitting quantized video data and video fine streams which are bitstreams of an error value corresponding to each of the quantized data.

The video coarse bitstreams are bitstreams of coefficients obtained by applying de-correlation transform (DCT) to video data and quantizing the video data. The video fine bitstreams are bitstreams of a quantizing error generated after DCT is applied to video data.

As described above, a method of generating a signal is varied depending on a type of data transmitted from the PHY system. Referring to an example illustrated in FIG. 9, audio data and video data go through encoders 71 and 72, respectively, and other control data such as data/control bitstreams and test bitstreams are transmitted to a bitstream MUX 73 without going through encoding. Among the video data, the video coarse bitstreams are transmitted to the bitstream MUX 73 after going through encoding, whereby a total of four signals are unified to form one bitstream. At this time, the video dependent DLPDU mode includes video coarse bitstreams but the independent DLPDU mode excludes the video coarse bitstreams.

A coarse stream encryptor 74 encrypts all data excluding header information (BH and EH) from a signal input from the bitstream MUX 73 as one bitstream, in accordance with AES-128 mode. A bitstream processor 75 modulates the encrypted signal to a radio signal (symbol) based on a QAM mode and adds an error correction code.

Meanwhile, the video fine data are processed independently by a fine data processing and encryption module 78 to transmit data more safely unlike the aforementioned four data. At this time, the fine data processing and encryption module 76 includes a fine-data scaling module, a fine-data symbol mapper, a fine-data encryptor, and a fine-data scrambler.

In the aforementioned example, a total of five data gone through the aforementioned separate processing procedure are the video fine data gone through the fine data processing and encryption module 76 and the other four data unified into one data. These five data are input to a MIMO OFDM mapper 77. The MIMO OFDM mapper 77 distributes the input signal into the RF-chain module 78 through subcarrier or each transmitting antenna to apply MIMO based on antenna diversity, channel matrix calculation and DCT. In this case, each dedicated subcarrier can be allocated using carrier signals having different central frequencies for each of video coarse data and video fine data.

In the Nth transmit chains 78, a downlink IDFT unit 781 transforms each subcarrier signal which is finally calculated, on a time axis and unifies the subcarrier signals. A CP inserter 782 copies a block of a certain size at a rear part of a previous symbol into a front part of next symbol to avoid multi-path interference that may occur between OFDM symbols. A preamble Mux 783 performs signal realignment so that only preamble data are transmitted from the preamble transmission intervals 611 and 632 illustrated in FIG. 6. A symbol shaper 784 performs signal processing so that signal intensity in a frequency domain is within the range of a spectral mask requested by the WHDI system. The final signal is converted into an analog signal by a digital/analog converter of an analog and RF module 785, and the converted intermediate frequency (IF) is converted into a radio frequency (RF) signal of 5 Ghz through a mixer and then transmitted through an antenna.

The process of transmitting audio signal and video signals through an antenna in the DLPDU PHY structure of the WHDI system has been described as above.

In short, the active source device of the WHDI system always performs DCT for video data directly input from the PHY layer before transmitting the radio signal. As the DCT video data are quantized, transmission data are compressed, whereby more data are transmitted within a limited bandwidth. The quantized video data are split into video coarse data and video fine data, to which separate error correction encoding processes are applied. Alternatively, separate modulation modes can be applied to the video coarse data and the video fine data.

Hereinafter, each element in a subsystem of a DLPDU PHY layer of a WHDI active source device will be described in more detail.

Figure 10:
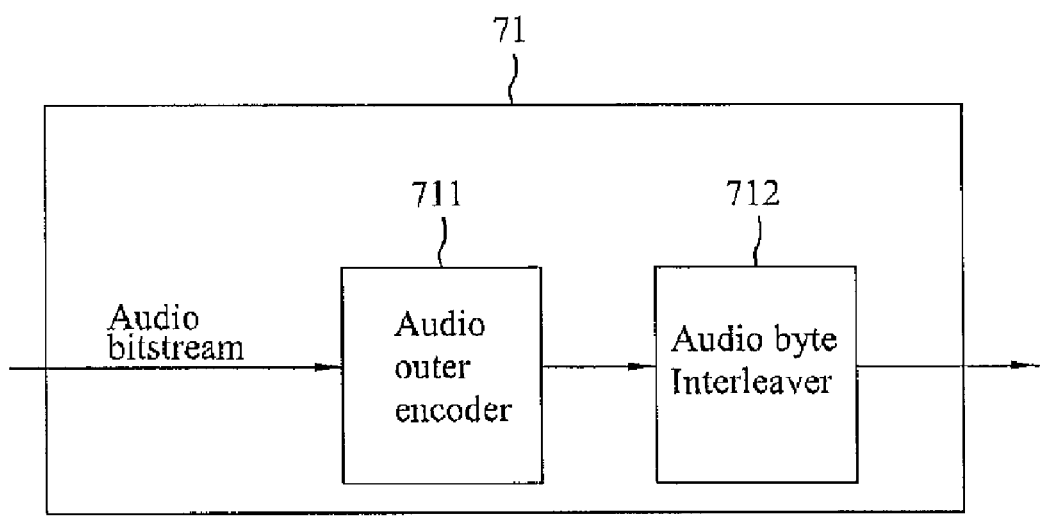
FIG. 10 is a diagram illustrating a structure of an audio encoder in an example of a DLPDU PHY structure of a WHDI active source device.

FIG. 10 is a diagram illustrating a structure of an audio encoder in an example of a DLPDU PHY structure of a WHDI active source device.

Referring to FIG. 10, the audio encoder 71 includes an audio outer encoder 711 and an audio byte interleaver 712. The audio outer encoder 711 uses a Reed-Solomon mode as preprocessing of audio data. In this case, a polynomial, $P(x)=1+x^2+x^3+x^4+x^8$, is used. For example, equivalent data of 16 bytes are added to data of 239 bytes, whereby data of a total of 255 bytes are generated. These resultant data values are again interleaved by a convolutional byte-interleaver of an audio byte interleaver 712. In this case, distortion of an audio signal such as a radio error can be reduced.

Figure 11:
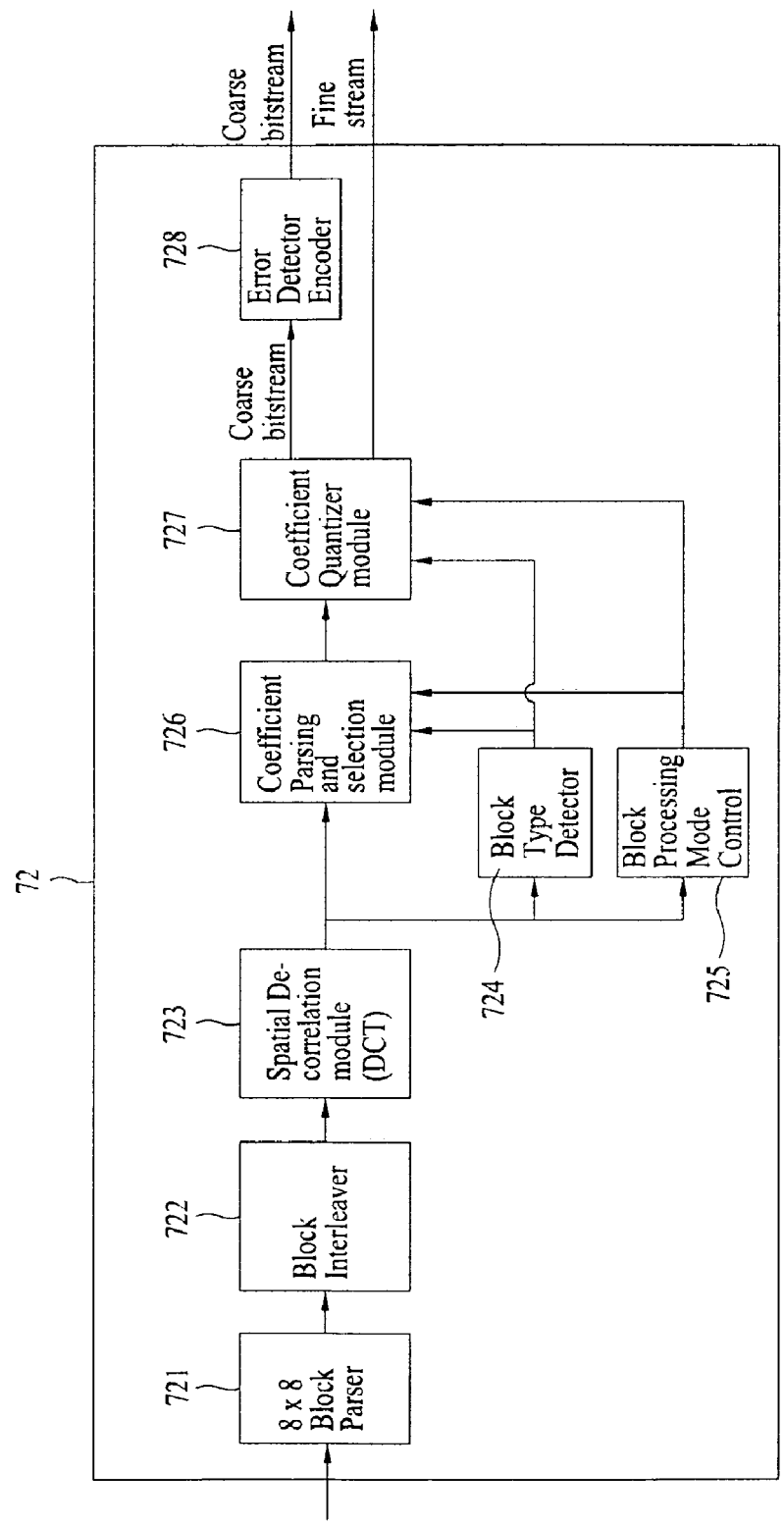
FIG. 11 is a diagram illustrating a structure of a video encoder in an example of a DLPDU PHY structure of a WHDI active source device.

FIG. 11 is a diagram illustrating a structure of a video encoder in an example of a DLPDU PHY structure of a WHDI active source device.

The video encoder 72 performs DCT for uncompressed video data (for example, pixel) of Y, Cb, Cr types using a frequency domain, divides the transformed signal into a DC component and an AC component, quantizes the components, and extracts errors generated during a quantizing process as video fine streams. The video encoder 72 extracts the quantized value as video coarse streams. After performing DCT using a frequency domain, the video encoder 72 selects high energy coefficients of low frequency components as much as available transmission capacity measured in the MAC layer and transmits the selected high energy coefficients to a unit for next process and discards the other signals.

In more detail, referring to FIG. 11, for DCT of video data, all pixels are grouped into a block of 8×8 by a block parser 721. For example, if block grouping is performed for pixels of 1920×1080 full HD size, the pixels can be grouped into a block of 240×135. Since grouping is performed in a block of 8×8, buffering should be performed in such a manner that horizontal blanking of a video bus is stored in a video memory of a transmitting side at least eight times.

Figure 12:
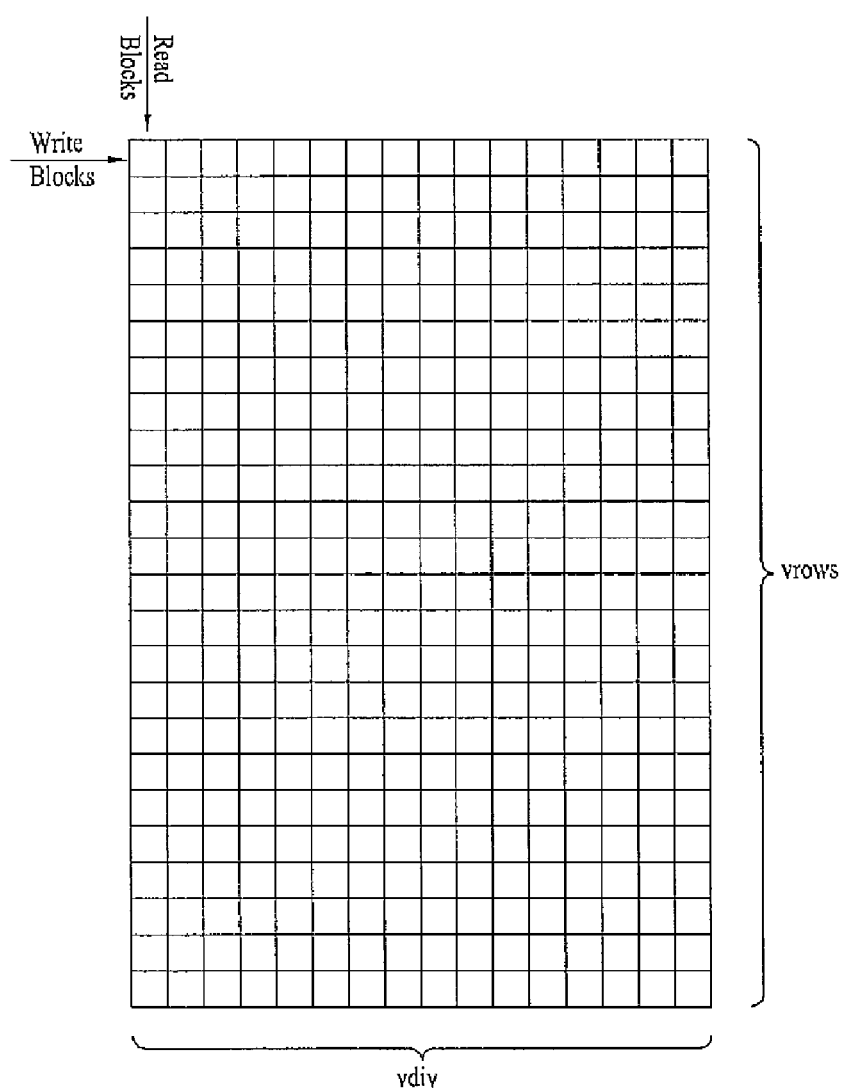
FIG. 12 is a diagram illustrating an example of block interleaving performed by a video encoder of FIG. 11.

A block interleaver 722 interleaves columns and rows as illustrated in FIG. 12 for blocks of 240×135 or some blocks in the whole screen of 1920×1080 full HD size, for example, to avoid a burst error. FIG. 12 is a diagram illustrating an example of block interleaving performed by a video encoder of FIG. 11.

A spatial de-correlation module 723 that performs DCT transforms each block where columns and rows are permutated by the block interleaver 722, into frequency components through DCT. Namely, to generate a set of coefficients for each block, the spatial de-correlation module 723 performs spatial de-correlation within each block. Spatial de-correlation is varied depending on a value of a coefficient corresponding to the signal transformed into frequency components. Referring to FIG. 11, the signal transformed into frequency components is input to a coefficient parsing and selection module 726 that parses and selects coefficients, in accordance with coefficient values, or input to the coefficient parsing and selection module 726 through a block type detector 724 that determines a type of each block and a block processing mode controller 725 that controls a processing mode of each block.

The block type detector 724 detects a type of each video block. At this time, two block types are defined: type 0 and type 1. Typically, after DCT, blocks with low energy at their high frequency coefficients are of type-0, while blocks with high energy at their high frequency coefficients are of type-1. The specific block type decision rule may be implementer specific as long as the video quality requirements are met.

A block processing mode controller 725 performs a processing mode for all blocks by using either a first mode or a second mode. The first mode is a basic mode and is intended for all blocks, while the second mode is a refinement mode and is intended for blocks which do not change throughout a number of consecutive video frames. The specific block processing mode decision rule may be implementer specific as long as the video quality requirements are met. The first mode applies a quantizing process by selectively discarding high frequency components from the DCT video signal, and can generate relatively small video data. On the other hand, in the second mode, high frequency components are discarded from the DCT video signal, and relatively many video data can be transmitted through quantizing and error signal extracting processes. However, to apply the second mode when the source device transmits video data, the sink device should support the second mode that is the refinement mode. If the second mode and no process of discarding high frequency components is applied to all blocks, uncompressed transmission can be performed.

The coefficient parsing and selection module 726 parses and selects video coarse stream coefficients of each block based on the block type detected by the block type detector 724, block processing mode control indication performed by a block processing mode controller 725, a coefficient information table for selecting a proper coefficient, and available bandwidth provided by the MAC layer.

$N_{Coeffs\_per\_Block}$ is set by the MAC layer. $N_{Coeffs\_per\_Block}$ is a coefficient value per block and is determined by considering current radio receiving sensitivity and other throughput values. For example, if a radio channel status is not good due to a long distance between the source device and the sink device, $N_{Coeffs\_per\_Block}$ is set to have a small value, whereby all other coefficients corresponding to high frequency components shall be discarded.

A coefficient quantizer module 727 performs quantization for signals transmitted from the block type detector 724, the block processing mode controller 725, and the coefficient parsing and selection module 726. To generate video coarse bitstreams and video fine bitstreams of complex symbol values, the coefficient quantizer module 727 can quantize coefficients of each block based on the type of each block, detailed control indication information, proper quantizing table, and available bandwidth provided by the MAC layer.

A subset of the DCT coefficients is quantized for each video block. Each coefficient that is quantized produces two outputs: a video fine coefficient and a sequence of one or more quantization bits. The coefficients that are not quantized remain unchanged and are hereinafter referred to as video fine coefficients.

The quantizing process performed by the coefficient quantizer module 727 shall be supported as follows:

1) 9 different uniform quantizers that may be used for the DC DCT coefficients (i.e. $X^D[0,0]$). Each quantizer is specified by the number of its output bits; and 2) 3 different non-uniform quantizers that may be used for the non-DC DCT coefficients, i.e., AC components (i.e. $X^D[k,l]$ $k=0, 1, 2, \ldots, 7$ $\{k,l\} \neq \{0,0\}$,). Each quantizer is specified by the number of its output bits.

Each N-bit coefficient quantizer is defined by $2^N$ quantization value and $2^N$ quantization regions; the $2^N$ quantization values, each corresponding to one quantization region, and the $2^N$ quantization regions including $2^N$ N-bit sequences, each corresponding to one quantization region. It is supposed that the DCT-coefficient is quantized by $X^D$, and the quantization is quantized by an N-bit quantizer by:

$$X^D \xrightarrow{N} \{\tilde{X}^D, b_0 b_1 \ldots b_{N-1}\}.$$

The quantization process is done as follows:

1) find the quantization region $r^i$ within which the coefficient $X^D$ is lying. Mathematically this is done according to:

$$X^D \xrightarrow{N} r^i \mathit{iff} R^i_{min} \leq X^D < R^i_{max}$$

where if means if and only if:

2) quantize the coefficient $X^D$ to produce the quantization value $q(X^D)$ corresponding to the quantization region $r^i$;

3) generate the N-bit sequence $b_0 b_1 \ldots b_{N-1}$ corresponding to the quantization region $r^i$. This N-bit sequence is the bit sequence output of the quantization process with the output bit $b_0$ being the earliest in the stream; and 4) calculate the quantization error defined by: $\tilde{X}^D = X^D - q(X^D)$. This quantization error is the video fine coefficient output of the quantization process.

For the coefficients that are not quantized, $\tilde{X}^D = X^D$, and no bit sequence is generated.

Hereinafter, the quantization bits produced for each video block will be described with reference to FIG. 13. FIG. 13 is a diagram illustrating quantization bits produced for each video block in a DLPDU PHY structure of a WHDI active source device.

The selection of the quantized coefficients and the number of bits are allocated depending on the first block mode (basic mode) or the second block mode (refinement mode), video format and Bandwidth limitations. For blocks processed with the second mode, all quantization bits are set to 0.

For every block, the number of total quantization bits is $N_{Bits\_per\_Block}$, as set by the MAC layer. The MAC layer also provides the parameter $N_{Bits\_fraction}$ with a value greater or equal to 0 and smaller than 64. This value is used for rate adjustment, by appending a single '0' valued bit to the first $N_{Bits\_fraction}$ video blocks output within every group of 64 video blocks. At this time, rate adjustment starts from the first video block, by attaining a constant bit rate when averaging over groups of 64 blocks. This bit is referred to as "rate adjustment bit". The rate adjustment bit, if added, is added after all quantization output bits of the block. The bits generated for each video block shall further be prepended by a "type bit", indicating the type of the video block. The type bit shall precede any quantization bit and rate adjustment bit (if produced). The type bit shall take the value '0' for type 0 blocks, and the value '1' for type 1 blocks.

The type bit, quantization bits, and rate adjustment bit (if added) shall be further prepended by a "processing bit", indicating the processing of the video block. The processing bit shall be set to 0 by the source device for all blocks when a signal is transmitted to a sink that does not support the second mode.

After the quantizing process is performed, the video fine streams are extracted, which correspond to the difference between the quantized coefficient and a previous value before quantization.

The bitstream MUX 73 multiplexes the four bitstreams (data/control bitstream, audio encoder output bitstream, video coarse bitstream, test bitstream) for further processing as one coarse stream. At this time, the header information (BH, EH) is excluded from the control information. The coarse stream encryptor 74 encrypts video coarse streams excluding header information (BH, EH) processed as one stream by the bitstream MUX 73.

The bitstream processor 75 will be described with reference to FIG. 14.

Figure 14:
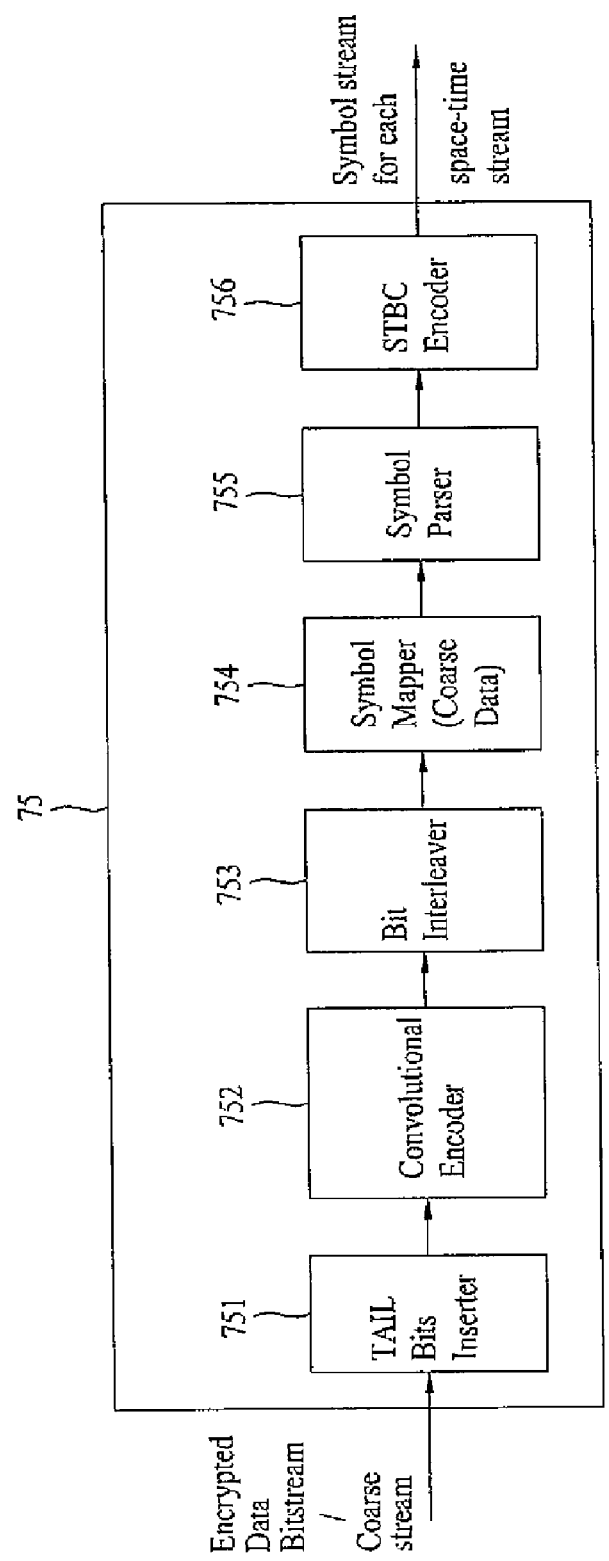
FIG. 14 is a diagram illustrating a bit stream processor in an example of a DLPDU PHY structure of a WHDI active source device.

FIG. 14 is a diagram illustrating a bit stream processor in an example of a DLPDU PHY structure of a WHDI active source device.

The bitstream processor 75 includes a TAIL bits inserter 751, a convolution encoder 752, a bit interleaver 753, a symbol mapper 754, a symbol parser 755, and a space time block code (STBC) encoder 756.

The video coarse streams are transmitted with an error correction code more reinforced than that of the video fine streams. Referring to FIG. 14, the convolution encoder 752 and the STBC encoder 756 add the error correction code to the video coarse streams. At this time, in addition to the video coarse bitstreams, other data streams gone through the encryption process by being multiplexed by the bitstream MUX 73 also go through the bitstream processor.

Figure 15:
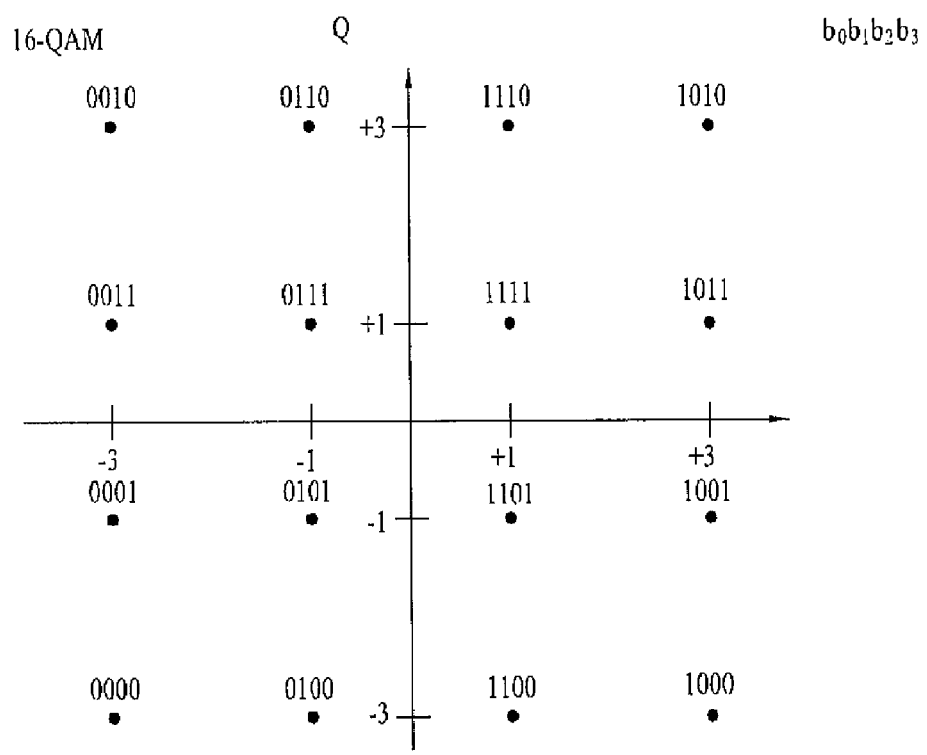
FIG. 15 is a diagram illustrating 16QAM arrangement of video coarse streams for conversion to IQ orthogonal phase coefficients in an example of a DLPDU PHY structure of a WHDI active source device.

The TAIL bits inserter 751 adds the last bit '0' to receive the input of the convolution encoder. Encoding rates of ½, ¾ and ⅚ are used by each encoder. The encoding rate can be varied depending on the radio status. For example, the encoding rate of ½ is used if the radio status is good, and ⅚ is used if not so. The bitstreams gone through the convolution encoder 752 are spread together with adjacent bits by the bit interleaver 753. The symbol mapper 754 converts the video coarse bitstreams into IQ orthogonal phase coefficients for conversion to analog signals. As illustrated in FIG. 15, bitstreams of the video coarse streams can always be encoded by only 16-QAM.

FIG. 15 is a diagram illustrating 16QAM arrangement of video coarse streams for conversion to coefficients of IQ orthogonal phase in an example of a DLPDU PHY structure of a WHDI active source device. In 16QAM, four bitstreams are converted into one symbol.

Figure 16:
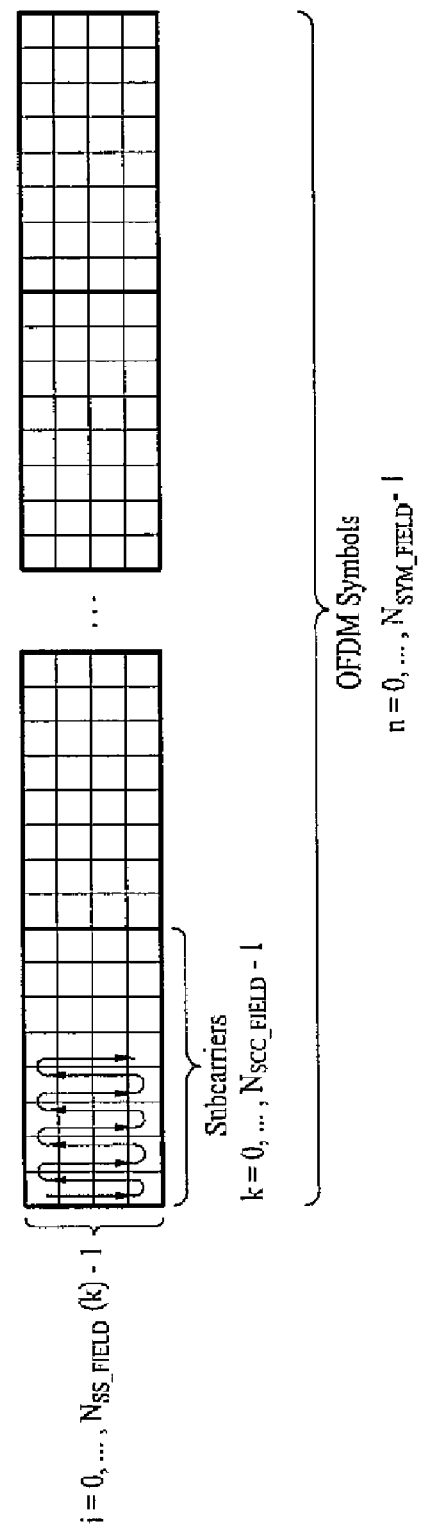
FIG. 16 is a diagram illustrating an example of a process of parsing OFDM symbols in a symbol parser in an example of a DLPDU PHY structure of a WHDI active source device.

FIG. 16 is a diagram illustrating an example of a procedure of parsing OFDM symbols in a symbol parser in an example of a DLPDU PHY structure of a WHDI active source device.

A DLPDU symbol parser 725 distributes 16-QAM symbols to demodulated symbol streams in the order of subcarriers allocated to the video coarse streams and spatial streams (transmit chain).

The DLPDU uses a plurality of spatial streams due to its more transmission rate (200 Mbps or greater in case of 1080p) than that of uplink data. Referring to FIG. 16, the DLPDU symbol parser 725 converts input streams of IQ complex signals into vectors such as OFDM symbols, subcarriers, and spatial streams.

For example, it is supposed that four MIMO channels, Nsym number of OFDM symbols, and Nscc number of subcarriers exist. In this case, <OFDM symbol #1, Subcarrier #1, Spatial Stream #1> <OFDM symbol #1, Subcarrier #1, Spatial Stream #2> <OFDM symbol #1, Subcarrier #1, Spatial Stream #3> <OFDM symbol #1, Subcarrier #1, Spatial Stream #4> <OFDM symbol #1, Subcarrier #2, Spatial Stream #1> <OFDM symbol #1, Subcarrier #2, Spatial-Stream #2> ... <OFDM symbol #2, Subcarrier #1, Spatial-Stream #1> <OFDM symbol #2, Subcarrier #1, Spatial-Stream #2> ... <OFDM symbol #Nsym, Subcarrier #Nscc, SpatialStream #3> <OFDM symbol #Nsym, Subcarrier #Nscc, SpatialStream #4> are sequentially allocated to input data, Complex 0, Complex 1, . . . , Complex T, . . . .

The STBC encoder 756 adds repeated error correction code to each spatial stream to reinforce error correction possibility.

Hereinafter, fine data processing and encryption performed by the fine data processing and encryption module 76 will be described with reference to FIG. 17.

Figure 17:
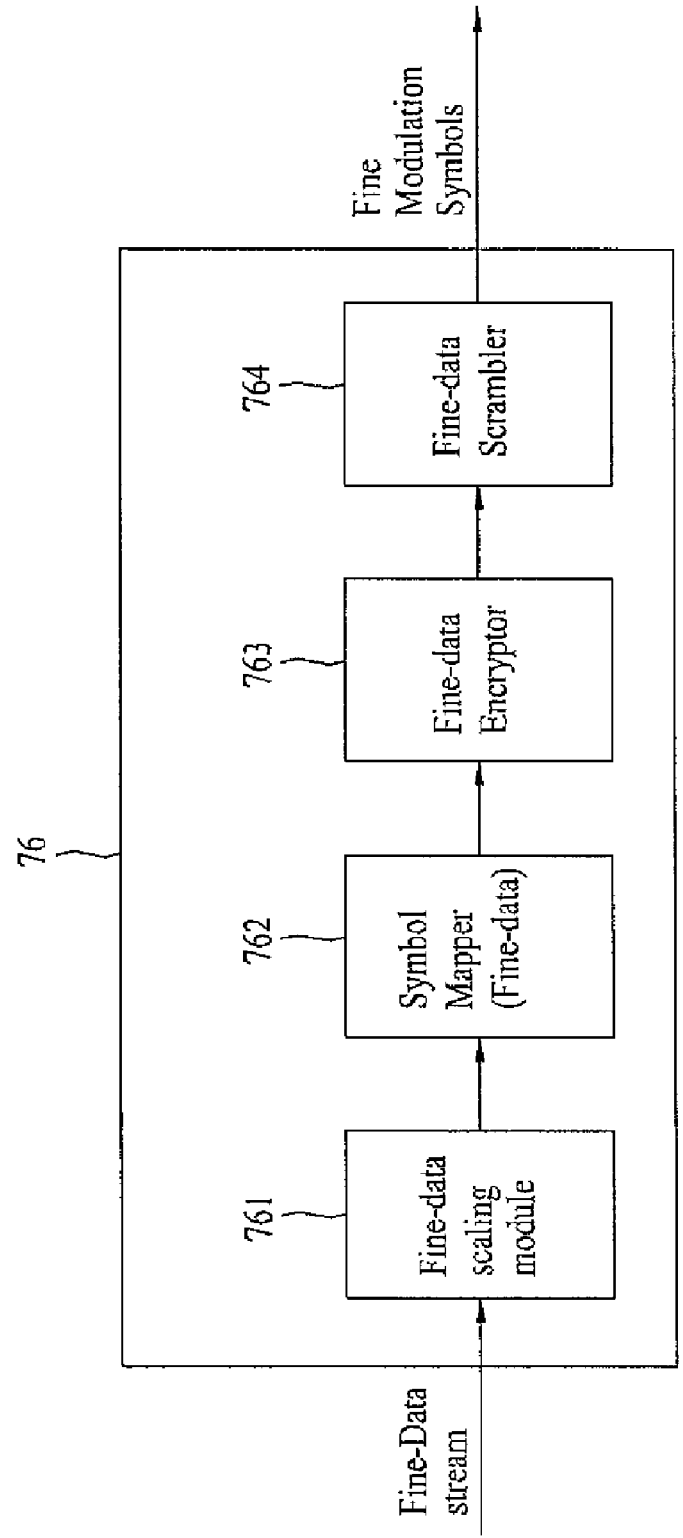
FIG. 17 is a diagram illustrating a fine data processing and encryption module in an example of a DLPDU PHY structure of a WHDI active source device.

FIG. 17 is a diagram illustrating a fine data processing and encryption module in an example of a DLPDU PHY structure of a WHDI active source device.

The video fine data streams gone through the video encoder 72 go through fine data scaling in the fine data processing and encryption module 76. A fine-data scaling module 761 where fine data scaling is performed uses a variable scaling elements depending on whether each video block grouped into 8×8 is type 0 or type 1. For example, all fine data included in the video block of type 0 are multiplied by 1.75, while all fine data included in the video block of type 1 are multiplied by 1. In this way, scaling is performed.

Afterwards, the scaled video data go through symbol mapping in the symbol mapper 762. Fine data modulation is different from general digital/analog modulation (BPSK, QPSK, QAM). First of all, one fine data stream is grouped into two fine data, for example, fine data of Y component in one pixel and fine data of Chroma component. As one fine data stream is divided into two groups, one modulation symbol includes two fine data after the fine data processing encryption procedure is completed. The first fine data has a real number value, and the second fine data has an imaginary value. In the modulation process, a symbol ± is used as it is before modulation is performed, and modulation is performed using an orthogonal phase carrier complex mode. For example, when each IQ has a size of ±2047 and a maximum available value of fine data is 1007.5, the first data is +22 and the second data is −24. In this case, IQ is given as follows: I=(22*2)+32=76, Q=(−24*2)+32=−80. This is advantageous in that twice more data than those of the fine data stream modulation mode such as 16QAM and 64QAM can be expressed in one symbol. As described above, when fine data are modulated in the active source device, one of fine data elements corresponding to Y, Cb, Cr components of one pixel is not decomposed into components I and Q. Instead, one of fine data elements is connected with I component and the other fine data element is connected with Q component.

Afterwards, the fine data encryptor 763 encrypts the symbols gone through the modulation process as complex input signals using AES-128 CTR in accordance with a key set in the fine data encryptor. The encrypted complex output signals are scrambled by a fine data scrambler 764 to avoid burst error.

The MIMO-OFDM mapper 77 maps coarse-data complex valued symbols, fine-data complex valued symbols, fixed pilots, and moving pilots into appropriate space time streams, subcarriers, and OFDM symbols. The MIMO-OFDM mapper 77 also allocates a specific subcarrier as a subcarrier for the fixed pilots and the moving pilots, whereby the receiving side performs time synchronization or channel measurement using the subcarrier.

The preamble MUX 783 performs multiplexing between the preamble field and all other (CES, BH, EH, IQ, DATA) fields, thus generating the entire DLPDU. During the time designated for preamble field, the preamble MUX 783 selects as input the preamble, whereas during the time designated for other fields (CES, BH, EH, IQ, DATA), the preamble MUX 783 selects as input, the output of the OFDM modulator.

Figure 18:
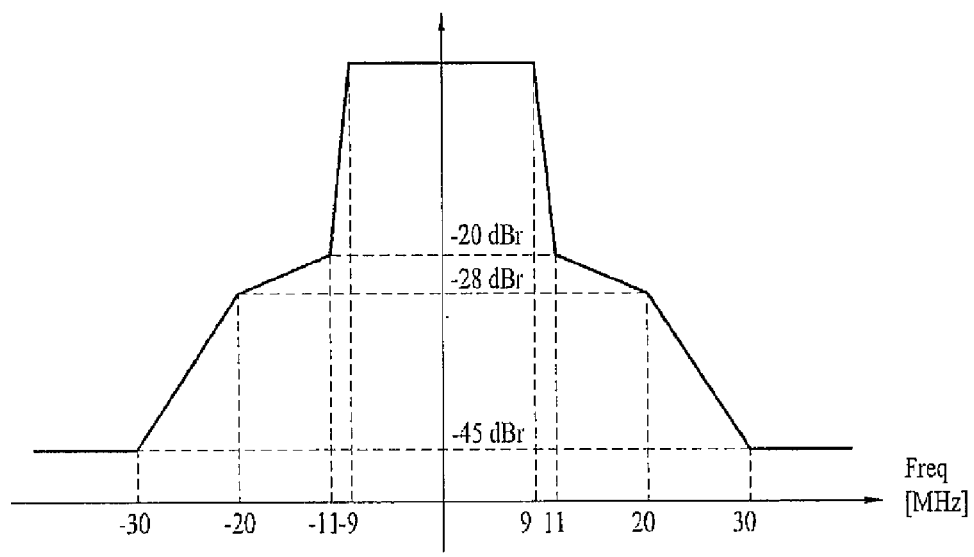
FIG. 18 is a diagram illustrating an example of a spectrum during DLPHY RF transmission in a WHDI active source device.

The symbol shaper 784 performs symbol shaping such that the spectral mask as defined in FIG. 18 is met.

FIG. 18 is a diagram illustrating an example of a spectrum during DLPHY RF transmission in a WHDI active source device.

The overall transmitted Baseband signal is composed of the contribution of all the fields, and fulfills the following Equation 1.

$$r_{DLPDU}^{(i_{Tx})}(t) = r_{Pre}^{(i_{Tx})}(t) + r_{CES}^{\prime(i_{Tx})}(t - t_{CES}) + r_{BH}^{\prime(i_{Tx})}(t - t_{BH}) + \\ r_{EH}^{\prime(i_{Tx})}(t - t_{EH}) + r_{IQ}^{\prime(i_{Tx})}(t - t_{IQ}) + \tilde{r}_{DATA}^{(i_{Tx})}(t - t_{DATA}),$$ [Equation 1]

where $r'^{(i_{Tx})}CES(t)$, $r'^{(i_{Tx})}BH(t)$, $r'^{(i_{Tx})}EH(t)$, $r'^{(i_{Tx})}IQ(t)$ are filtered versions of r $r^{(i_{Tx})}CES(t)$, $r^{(i_{Tx})}BH(t)$, $r^{(i_{Tx})}EH(t)$, $r^{(i_{Tx})}IQ(t)$, respectively. The DLPHY signal generated by the symbol shaper 784 has a frequency feature of a maximum spectral mask as illustrated in FIG. 18.

Next, the uplink where the PHY signal is transmitted from the WHDI system to the sink device or from the passive source device to the active source device will be described.

As described above, the active source device transmits video data or audio data to one or more devices, and the passive source device is additionally connected with the active source device without transmitting video data. The sink device receives video data or audio data from the active source device. Hereinafter, it is regarded that the sink device includes the active source device.

In the PHY interval, the uplink interval is divided into a mode that generates an uplink independent PHY data unit (ULIPDU) and a mode that generates an uplink control PHY data unit (ULCPDU).

The ULIPDU transmits a signal intended to notify its existence while circulating several channels within a 5 Ghz UNII band to detect the source device in a state that the sink device is connected with a specific source device but is not connected with the MAC layer. The ULCPDU corresponds to a PHY mode where the radio device connected with the active source device transmits a control signal to another device using a short time by avoiding the DLPDU, as described with reference to FIG. 7.

Hereinafter, generation of ULIPDU will be described with reference to FIG. 19 to FIG. 23.

Figure 19:
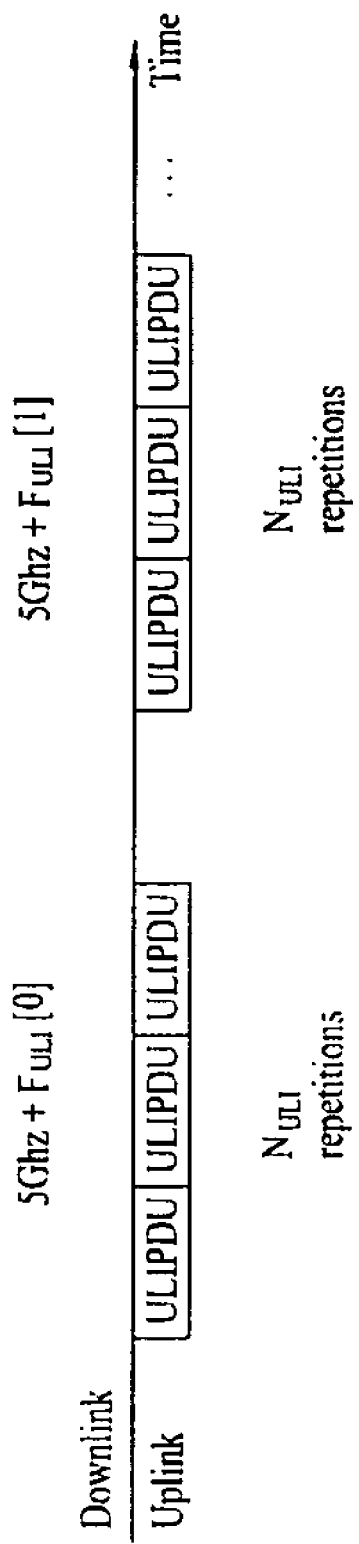
FIG. 19 is a diagram illustrating an example of ULIPDU transmission from a sink device to a source device in a WHDI system.

FIG. 19 is a diagram illustrating an example of ULIPDU transmission from a sink device to a source device in a WHDI system.

The ULIPDU is similar to the video independent DLPDU having no relation with video data, and has a relatively long signal time. The ULIPDU consecutively transmits several signals or repeatedly transmits the signal with a short pause time, and then receives a response to the transmitted signal. As illustrated in FIG. 19, after transmitting 8750 ULIPDU signals of 400 uS for 3500 msec, the ULIPDU waits for a signal response for 400 ms and again transmits a set of 8750 same ULIPDU signals. Namely, a group of the sink devices of the ULIPDU forms one $T_{uli}$ period and guides a response of the source device while circulating a 5 Ghz U-NII frequency band such as Fuli[0] and Fuli[1].

Figure 20:
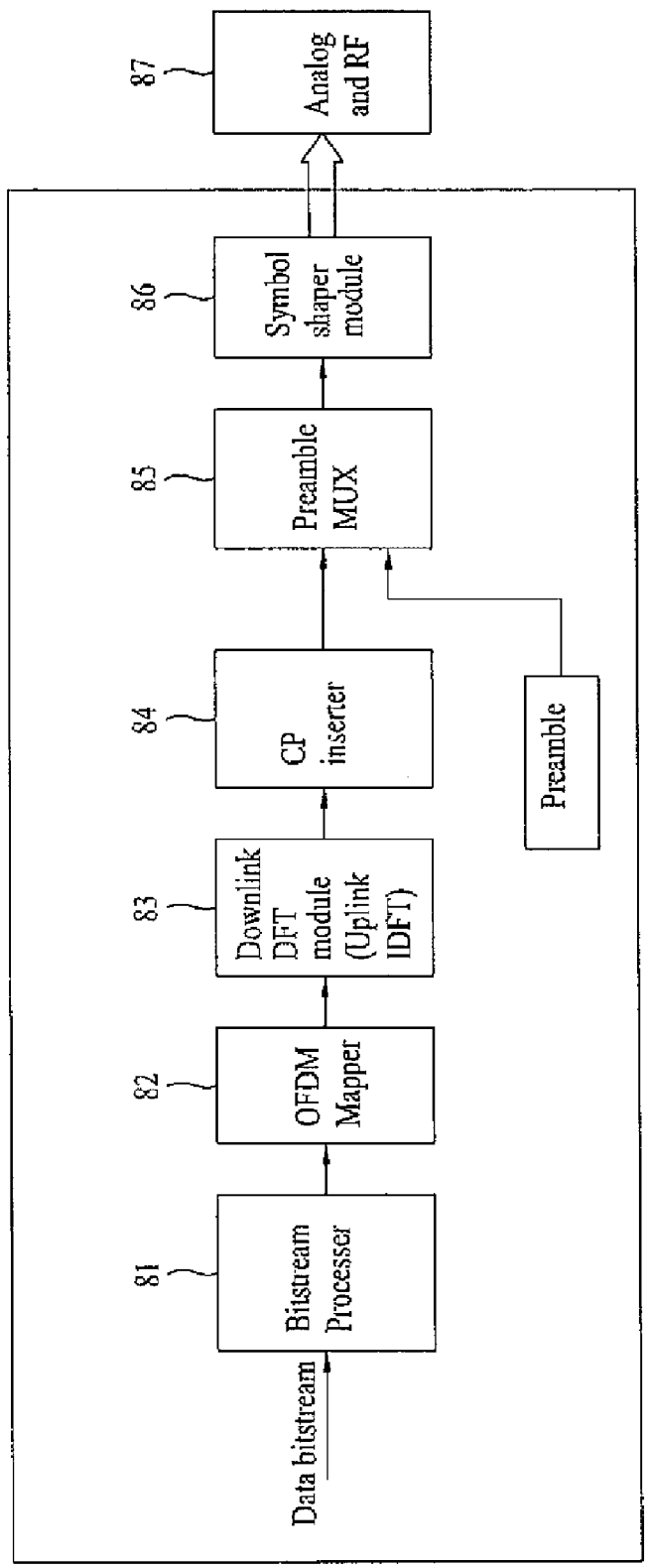
FIG. 20 is a block diagram illustrating a transmitting device that performs ULIPDU transmission to a receiving device in a WHDI system.

FIG. 20 is a block diagram illustrating a transmitting device that performs ULIPDU transmission to a receiving device in a WHDI system.

The transmitting device that transmits ULIPDU includes a bitstream processor 81, an OFDM mapper 82, an uplink IDFT (downlink DFT) module 83, a CP inserter 84, a preamble MUX 85, a symbol shaper module 86, and an analog and RF module 87. Each element processes only data not audio data or video data. The data transmitted through the ULIPDU includes device ID (6 bytes value), ID of a device intended to seek, and vendor ID.

In an address system of WHDI, each device has its unique ID. Device ID is a MAC address of 6 bytes, which can identify each of all WHDI devices. Generally, if it is supposed that WHDI-HDMI bridge (adaptor) is a basic device, a device attached to the basic device is referred to as a sub device (for example, DVD, STB, Blueray, etc.), and 1 byte address called LSA (logical sub-address) is added to each sub device. If a network is connected with each WHDI device, 1 byte address called ANA (active network address) is added to each WHDI device. In this way, each device can be identified based on a device address system comprised of device ID, LSA, and ANA.

Figure 21:
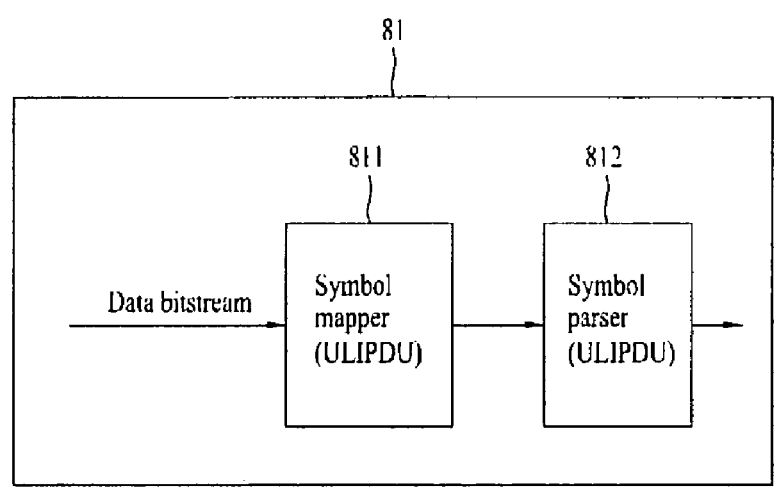
FIG. 21 is a diagram illustrating a bit stream processor of a transmitting device that performs ULIPDU transmission in a WHDI system.

FIG. 21 is a block diagram illustrating a bit stream processor of a transmitting device that performs ULIPDU transmission in a WHDI system.

Referring to FIG. 21, the ULIPDU bitstream processor 81 includes a symbol mapper 811 and a symbol parser 812. ULIPDU data modulation is performed by the symbol mapper 811 using on-off keying (OOK). For example, if one phase carrier is used, carrier scale (intensity) becomes 0 when an input bit is 0 and becomes Error! Objects cannot be created from editing field codes. when an input bit is 1. The modulated symbol (complex signal) is allocated to each OFDM symbol through the symbol parser 812. One OFDM symbol can allocate complex signal inputs equivalent to the number of subcarriers. The ULIPDU is transmitted to one spatial stream and one space time stream without using multi-antenna technology such as MIMO and STBC. The number of subcarriers of the ULIPDU OFDM is relatively smaller than that of subcarriers of DLPDU OFDM. This is because that a required data rate of a control signal is smaller than 1 Mbps as compared with a data rate of 200 Mbps or greater required for video data transmission of 1080p or greater.

The OFDM mapper 82 maps data complex valued symbols and pilots into appropriate subcarriers and OFDM symbols. The OFDM mapper 82 may also generate the pilots.

In the WHDI system, the ULIPDU DFT module 83 substantially has a function of DFT/IDFT, and operates as DFT during reception in the downlink while operates as IDFT during transmission in the uplink. Namely, based on the sink device, the ULIPDU DFT module 83 operates as IDFT during transmission while operates as DFT during reception.

The ULIPDU CP inserter 84 adds a cyclic period to a transmission procedure of a signal transformed by IDFT to avoid multi-path interference between OFDM symbols. The ULIPDU preamble MUX 85 performs multiplexing between the preamble field and all other (CES, DATA) fields, thus generating the ULIPDU. During the time designated for preamble field, the ULIPDU preamble MUX 85 selects as input the preamble, whereas during the time designated for CES and DATA fields, the ULIPDU preamble MUX 85 selects as input, the output of the OFDM modulator.

Figure 22:
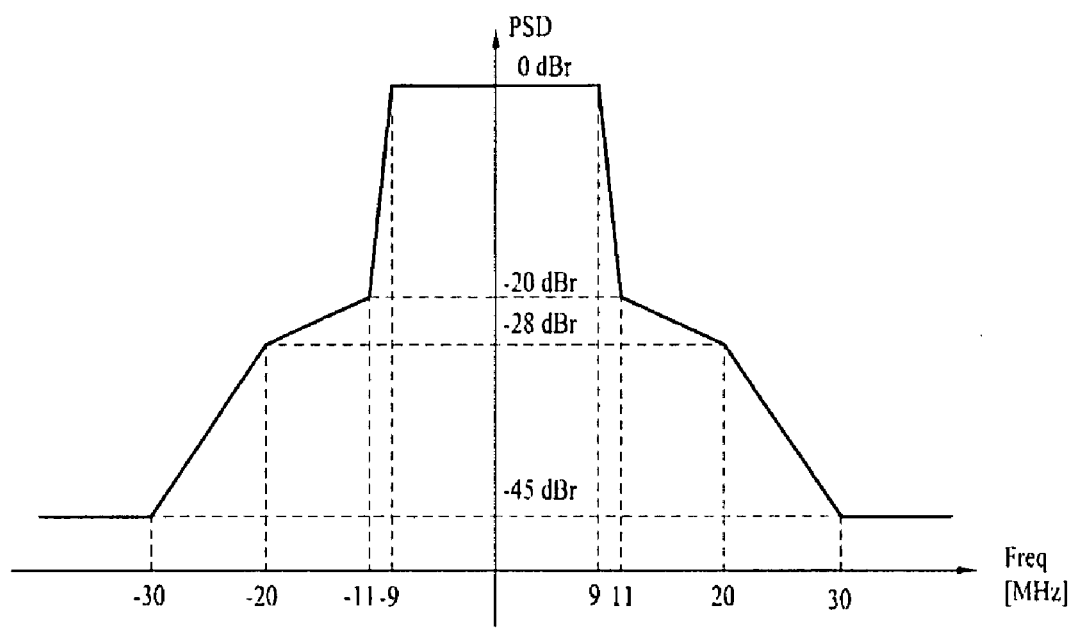
FIG. 22 is a diagram illustrating a transmission spectrum in case of 20 Mhz in a WHDI ULIPDU.

Afterwards, symbol shaping is performed by the ULIPDU symbol shaper module 86 such that the spectral requirements as defined in FIG. 22. FIG. 22 is a diagram illustrating a transmission spectrum in case of 20 Mhz in a WHDI ULIPDU.

Next, ULCPDU in the uplink will be described with reference to FIG. 23 to FIG. 25.

Generally, the PHY is designed to provide robustness and flexibility in order to support data rates of up to 100 kbps as well as for optimal operation in various home and office use case scenarios. This is achieved using various signal processing tools including OFDM modulation and frequency diversity. Two bandwidth modes, 20 MHz bandwidth mode and 40 MHz bandwidth mode can be used for PHY transmission. The two bandwidth modes are mandatory to supports for all WHDI devices.

In each bandwidth mode, shared medium and coexistence with other devices in the 5 GHz band is an important issue for maintaining high performance as well as avoiding interference to/from other systems. The ULCPDU modulation has been designed to coexist with existing devices. This coexistence is achieved by several means including carrier sense (CS), automatic frequency selection (AFS) and transmission power control (TPC).

The ULCPDU is an interval where the PHY for WHDI wireless transmission transmits data/control information from the sink device to the source device or the passive source device to the active source device using the uplink. Namely, the ULCPDU is a PHY signal sent, after the sink device receives the DLPDU from the active source device, from the sink device or the passive source device to another active source device, another sink device or another passive source device, to transfer the control message. The sink device or the passive source device fixes a channel and transmits the ULCPDU after finding the active source device.

Figure 23:
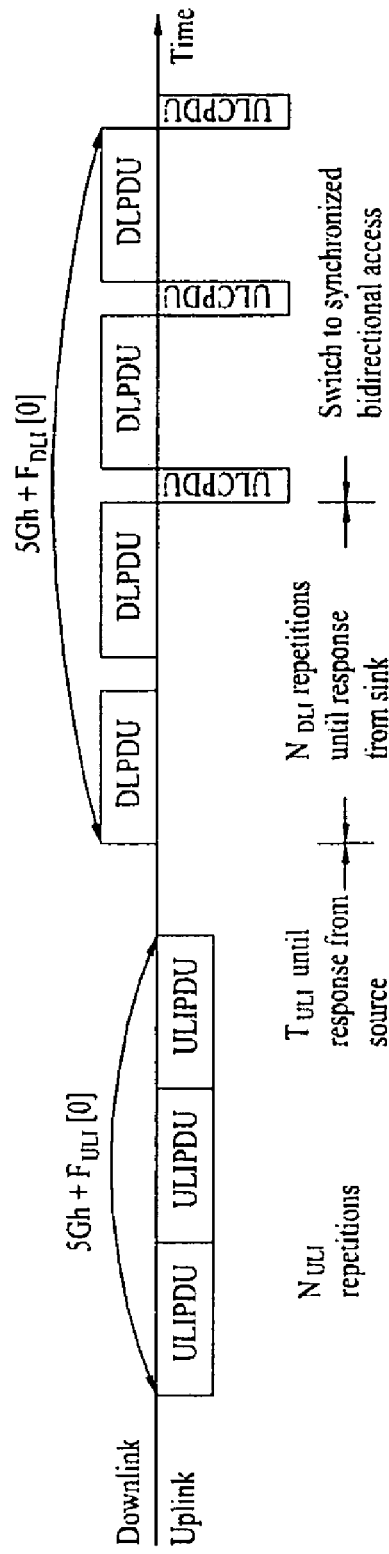
FIG. 23 is a diagram illustrating a video dependent timing relation between DLPDU and ULCPDU in a WHDI system, wherein PHY signal transmission in WHDI uses a bandwidth of 5 Ghz.

At this time, as illustrated in FIG. 23, ULCPDU transmission can be performed for a short time period between the DLPDU transmission intervals. FIG. 23 is a diagram illustrating a video dependent timing relation between DLPDU and ULCPDU in a WHDI system. As described above, PHY signal transmission in WHDI uses a bandwidth of 5 Ghz.

Figure 24:
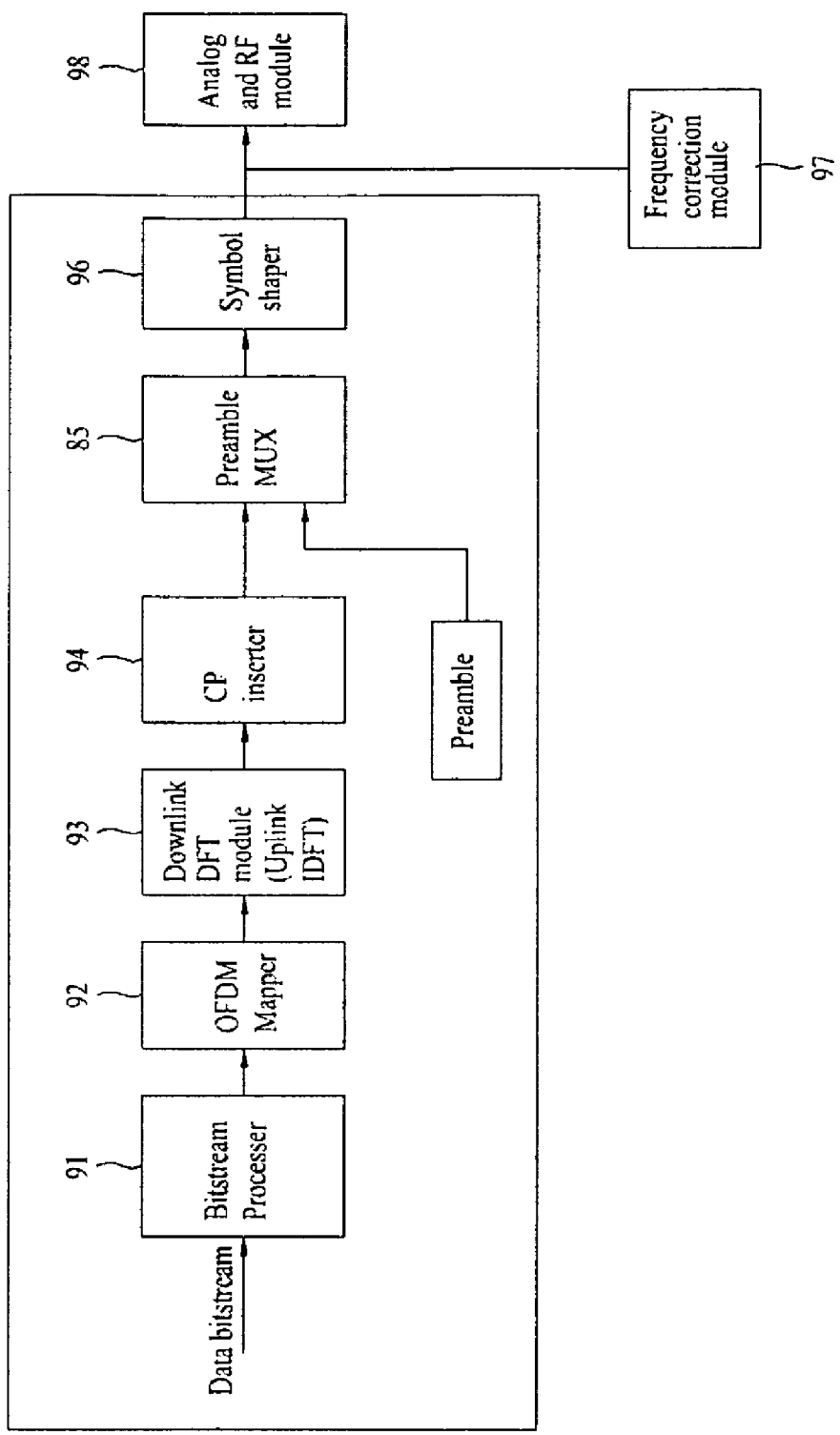
FIG. 24 is a block diagram illustrating a configuration of a ULCPDU transmitting device that transmits ULCPDU in a WHDI system.

FIG. 24 is a block diagram illustrating a configuration of a ULCPDU transmitting device that transmits ULCPDU in a WHDI system.

A reference implementation of the ULCPDU Baseband provides a reference for encoding the incoming control/data bitstream into an RF signal.

The ULCPDU transmitting device is similar to the aforementioned ULIPDU transmitting device of FIG. 21. Referring to FIG. 24, the ULCPDU transmitting device includes a bitstream processor 91 performing bitstream processing on the input data bitstream, an OFDM mapper 92 dividing the signals processed by the bitstream processor into pilots and data modulation symbols and mapping them into OFDM symbols, an uplink IDFT (downlink DFT) module 93 converting a block of constellation points to a time domain block, a cyclic prefix (CP) inserter 94 inserting the cyclic prefix to the modulated signal transmission, a preamble MUX 94 performing multiplexing between the preamble field and all other (CES, DATA) fields, a symbol shaper 96 performing symbol shaping on the time domain to comply with the spectral requirements, a frequency correction module 97 and an analog and RF module 98. Unlike the ULIPDU transmitting device, the frequency correction module 97 is only included in the ULCPDU transmitting device and performs frequency pre-correction to compensate for any frequency offsets between the transmitting device and the receiving device.

Figure 25:
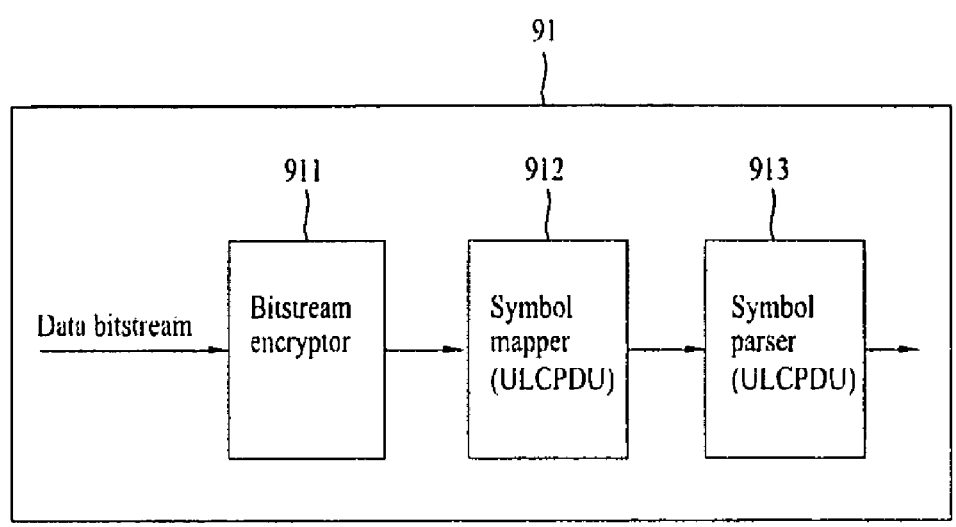
FIG. 25 is a block diagram illustrating a configuration of a bitstream processor in a ULCPDU transmitting device of a WHDI system.

Specifically, as illustrated in FIG. 25, the bitstream processor 91 includes a bitstream encryptor 911, a symbol mapper 912, and a symbol parser 913. FIG. 25 is a block diagram illustrating a configuration of a bitstream processor in a ULCPDU transmitting device of a WHDI system.

The bitstream encryptor 911 encrypts data bitstreams in accordance with AES-128 CTR mode. The symbol mapper 912 modulates the encrypted data bitstreams into a plurality of symbols in accordance with on-off keying mode in the same manner as the ULIPDU transmitting device. Afterwards, the symbol parser 913 determines what OFDM symbol includes each symbol.

The frequency correction module 97 is implemented in only the ULCPDU transmitting device. Frequency correction shall be performed prior to the transmission of the ULCPDU in order to compensate for any frequency offset between the ULCPDU transmitting device and a targeted ULCPDU receiver.

Frequency correction performed by the frequency correction module 97 is as follows.

$$\tilde{r}_{ULCFDU}(t) = \exp(j2\pi f_{cor} t) r_{ULCPDU}(t) \quad \text{[Equation 2]}$$

In the Equation 2, $f_{cor}$ shall be set by the MAC layer, and shall be estimated from DLPDUs received from the source device including the targeted ULCPDU receiver. Specifically, $f_{cor}$ shall be set such that the frequency offset between the ULCPDU transmitting device and the targeted ULCPDU receiver, after correction, is less than 1325 Hz. The analog and RF module 98 of the ULCPDU transmitting device can flexibly coordinate carrier frequency up to 1325 Hz depending on a receiving error occurring in the receiving side.

As described above, in the user devices belonging to the WHDI, the source device that transmits A/V data and the sink device that receives the A/V data have been described in detail. If signal split, DFT modulation and quantization are performed in the devices having the aforementioned structure, transmission and reception of A/V data is performed.

Meanwhile, two or more user devices belonging to the WHDI include an active source device that transmits A/V data, a sink device that receives the A/V data, and a passive source device. Transmission and reception of the A/V data may be performed directly between the devices or through the multi-path. Accordingly, the device intended to transmit a radio signal can select a path that can efficiently transmit and receive a signal through a performance test of one or more wireless paths.

In the current WHDI, a message that can implement a round trip time (RTT) test is not defined. The RTT means the time required from the time when packets transmitted from the transmitting side are transferred to the receiving side through a random number of intermediate access devices or communication networks to the time when a response signal to the packets reaches the transmitting side through a plurality of intermediate access devices or communication networks. For example, in case of IP protocol, if a transmitting side defines ICMP(Ping) packets and send the packets to a receiving side, the receiving side transmits the same packets to the transmitting side, whereby RTT and transmission success rate can be obtained with information of the received packets. Even in the WHDI, a specific message that can perform the role of the RTT can be added to the process of transmitting and receiving a radio signal.

Hereinafter, a method of exchanging an echo message as a specific message that can perform the role of the RTT during the process of performing A/V streaming between the source device and the sink device according to one embodiment of the present invention will be described.

Figure 26:
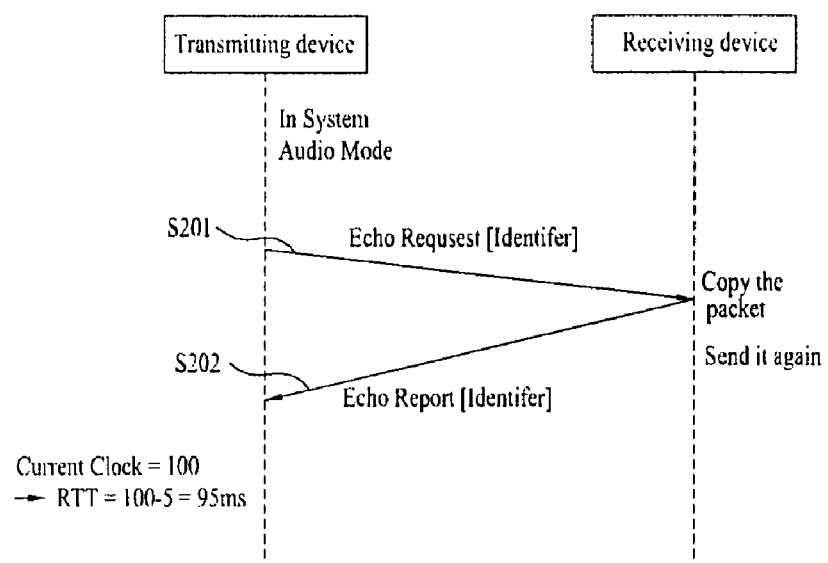
FIG. 26 is a diagram illustrating a process of transmitting and receiving an echo request command and an echo report command between WHDI devices.

FIG. 26 is a flow chart illustrating a process of exchanging an echo message between a transmitting device and a sink device in the process of transmitting and receiving a WHDI radio signal in accordance with one embodiment of the present invention.

The echo message includes an echo request command and an echo report command. Exchange between the echo request command and the echo report command can be performed in such a manner that the active source device transmits the echo request command to the sink device or vice versa.

Referring to FIG. 26, the transmitting device intended to transmit a signal transmits an echo request command, which includes at least one parameter corresponding to identifier, to the receiving device (S201). The receiving device which has received the echo request command transmits an echo report command, which includes the same parameter as that included in the echo request command, to the transmitting device (S202). Then, connection test between the devices, average communication rate assessment, and round trip delay assessment can be determined based on the aforementioned parameter.

Hereinafter, echo message exchange between the transmitting device and the receiving device will be described in more detail with reference to FIG. 2 and FIG. 3.

Referring to FIG. 2, the broadcasting signal receiving system that includes a broadcasting signal receiver as an example of the transmitting device can generate a signal including an echo request signal in the network control module 216 and transmit the signal to the receiving device 25 together with an external broadcasting signal input to the receiving module 211. The broadcasting signal receiving system can receive a radio signal including an echo report command from the receiving device 25 in response to the echo request command. Hereinafter, a signal processing procedure performed by the network control module 216 will be described.

In FIG. 3, in the transmitting device and the receiving device, which transmit and receive a radio signal between the WHDI devices, an example of the transmitting device includes a WHDI source device, and an example of the transmitting device includes a WHDI sink device.

The source device and the sink device can exchange an AVCL message therebetween, and exchanges a message and data through the PHY layer 34 of the network control module 216. For example, if the source device desires to transmit an AVCL request message to the sink device, the AVCL 32 of the source device transmits the AVCL request message to the sink device through the MAC layer 33 and the PHY layer 34 in due order. The sink device receives the AVCL request message through its PHY layer 34 and transfers the same to the AVCL 32 through the MAC layer 33. The AVCL 32 of the sink device generates a response message in response to the request message transferred from the source device and transmits the same to the source device through the MAC layer 33 of the sink device and the PHY layer 34 in due order.

In more detail, in the AVCL 32 of the transmitting device, the AVCL protocol is based on command or message exchange performed between the WHDI sub devices. If the receiving device which has received AVCL command requesting an action performs the requested action, the receiving device transmits <Action Accept> message. However, if the receiving device cannot or fails to perform the requested action, the receiving device transmits a response message such as <Action Reject>. Also, there are much more parameters, the first expected parameter is parsed and the other parameters should be discarded.

The AVCL command message transmitted through the transmitting device can include elements expressed in Table 1.

TABLE 1

| Field Name | Description | Size | Value |
| --- | --- | --- | --- |
| Initiator_Addr | Initiator_AVCL_Address | 2 Bytes | Byte 0: Initiator Device_ANA<br>Byte 1: Initiator Device_LSA |
| Follower_Addr | Follower AVCL_Address | 2 Bytes | Byte 0: Follower Device_ANA<br>Byte 1: Follower Device_LSA |
| AVCL_Opcode | Opcode | 1 Bytes | |
| AVCL_Parameter | Parameter(s) specific to opcode(Optional, depending on opcode) | Depends on Opcode | |

Referring to Table 1, one AVCL command includes a transmitting device address (Initiator_Addr), a receiving device address (Follower_Addr), AVCL_Opcode, and an AVCL parameter as Identifier. One or more devices included in the WHDI network should be identified. Accordingly, in order to match the aforementioned device address system, bits indicating the transmitting device address and the receiving device address should be provided additionally. The transmitting device address (Initiator_Addr) is an address of a transmitting device that transmits AVCL command, and has a size of 2bytes with 1byte indicating ANA (address given by active source device when the transmitting device is the active source device) and 1byte indicating LSA. The receiving device address (Follower_Addr) is a network address of a receiving device that receives AVCL command, and has a size of 2bytes with 1byte indicating ANA and 1byte indicating LSA. AVCL_Opcode represents a message type, and represents that the AVCL command is an echo request command when the transmitting device desires to transmit the echo request command to the receiving device. 1byte is allocated to AVCL-Opcode.

The size and type of the AVCL_parameter are varied depending on AVCL_Opcode. If the AVCL command is an echo request command, a random parameter can be used within the limit of 32 bits. As illustrated in FIG. 26, if the transmitting device transmits the echo request command to the receiving device, a predetermined parameter can be included in the echo request command. The receiving device which has received the echo request command can transmit the echo report command to the transmitting device in response to the echo request command, wherein the echo report command includes the same parameter as that included in the echo request command. As the same parameter as that included in the echo request command is included in the echo report command, RTT can be obtained through echo message exchange.

All AVCL commands generated by the AVCL 32 of the transmitting device are transmitted to the MAC layer 33 so that the AVCL commands are mapped into the MAC message by their equivalent type. The echo request command which is a kind of AVCL commands according to the embodiment of the present invention is also transmitted from the AVCL 32 to the MAC layer 33. The MAC message of the MAC layer 33 is a medium that substantially transfers information between WHDI devices. A type and length of the MAC message can be set variously depending on each of the AVCL commands.

FIG. 27 is a diagram illustrating a type of a media access control (MAC) message existing in a MAC layer 33 of a transmitting device. The type of the MAC message can be divided into a short MAC message and a long MAC message depending on whether the message includes a Null field. The MAC message illustrated in FIG. 27 is a short MAC message excluding the Null field. The Null field is a region allocated to transmit a Null message, and has a length of 1byte and a value of 0x00.

Referring to FIG. 27, the short MAC message includes MAC message preamble of 2bytes of 16-bits length, a bit indicating MAC message type of 2bytes, MAC message length of 1byte, MAC message body of various lengths, and a message check sequence (MCS) field of 16 bits including cyclic redundancy check (CRC) of 16 bits. The MCS message includes a CRC code added by the MCS layer 33 to detect an error in the receiving device. The MAC message body field can use various lengths from 1 bit to 254 bits depending on the AVCL command. Namely, when the transmitting device transmits the AVCL command to the receiving device, the AVCL command is included in the MAC body field of the MAC message of the transmitting device. According to the embodiment of the present invention, the echo request command is included in the MAC body field.

The MCS field can be calculated on all fields of the MAC message excluding message preamble field, message type message length, and message body field. The long MAC message includes the Null field.

As described above, for transmission from the transmitting device to the receiving device, the MAC message that includes AVCL command is transferred to the PHY layer 34. Information exchange between devices is performed through each PHY layer.

Figure 28:
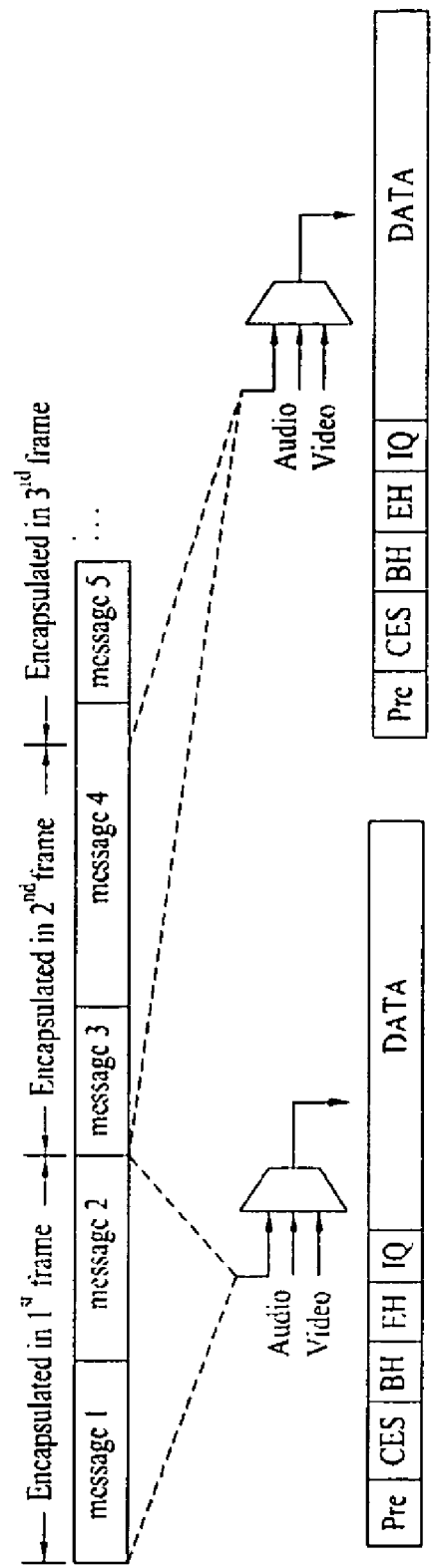
FIG. 28 is a diagram illustrating an example of transmission of a MAC message including an echo request command from a source device to a sink device through a DLPDU.
Figure 29:
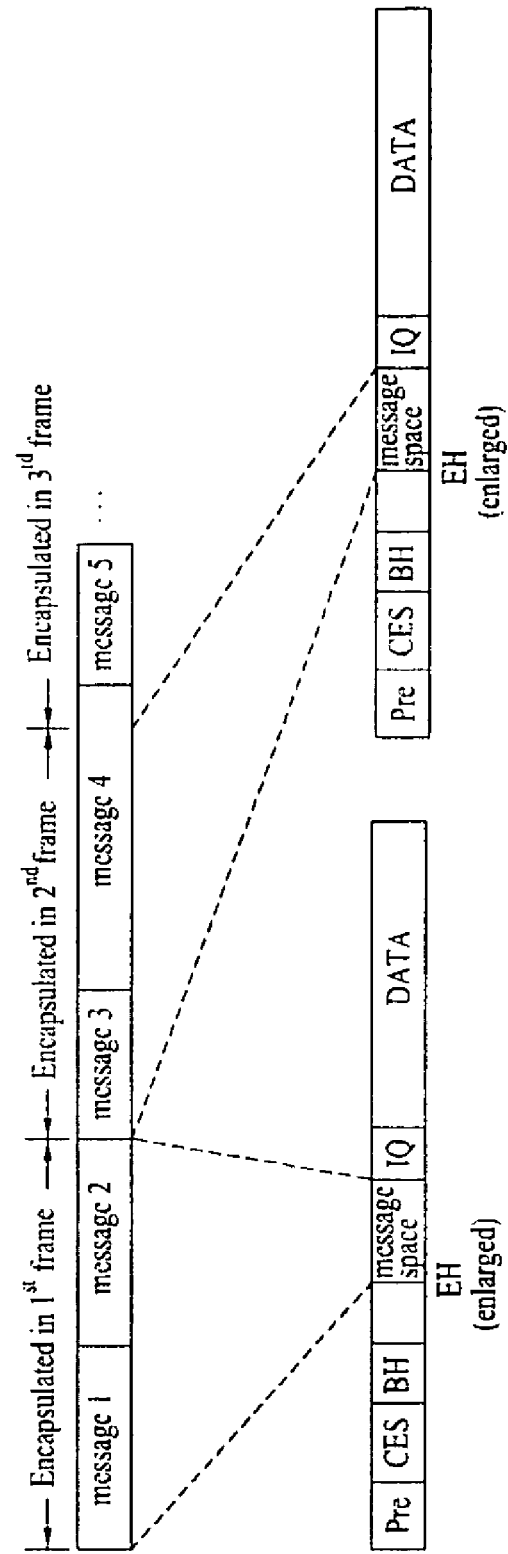
FIG. 29 is a diagram illustrating another example of transmission of a MAC message including an echo request command from a source device to a sink device through a DLPDU.
Figure 30:
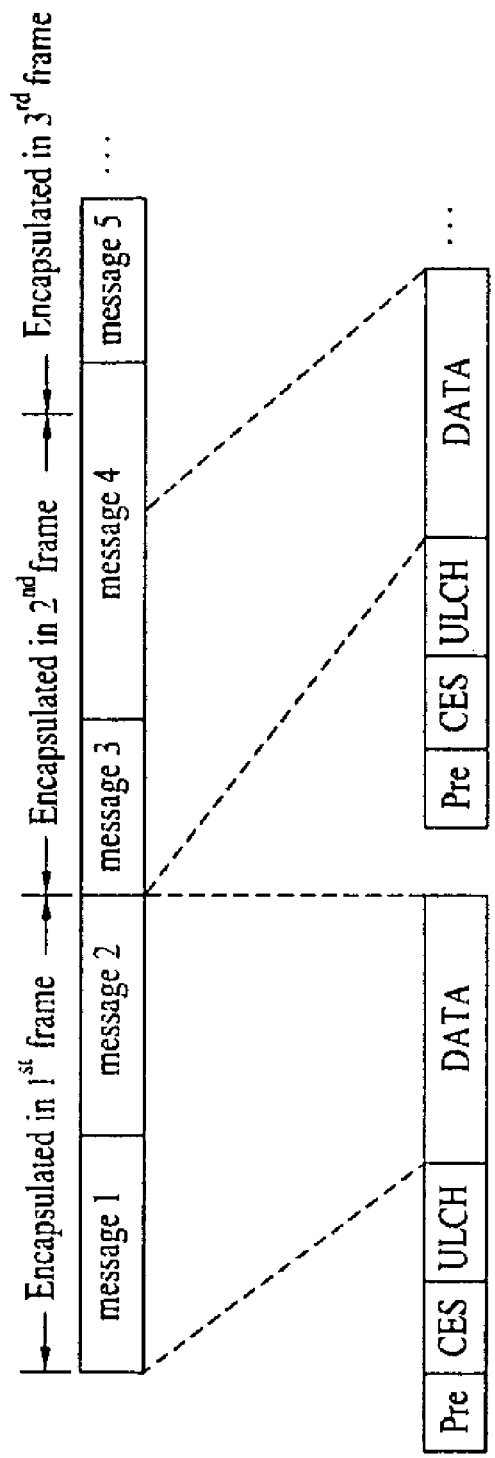
FIG. 30 is a diagram illustrating an example of transmission of a MAC message including an echo request command from a sink device to a source device through a ULCPDU.

Hereinafter, FIG. 28 to FIG. 30 illustrate diagrams illustrating examples of transmission of a MAC message from a WHDI transmitting device to a receiving device through a PHY layer in accordance with one embodiment of the present invention.

FIG. 28 and FIG. 29 are diagrams illustrating examples of transmission of a MAC message including an echo request command from a WHDI source device to a sink device in accordance with one embodiment of the present invention.

Referring to FIG. 28, the source device transmits a MAC message to the sink device through a DLPDU. Namely, FIG. 28 corresponds to step S201 of FIG. 26, in which the source device corresponding to the transmitting device transmits an echo request command to the sink device corresponding to the receiving device. In this case, the echo request command is included in a part of the MAC message that includes a plurality of messages. At least one of a plurality of MAC messages of the source device is allocated onto a plurality of frames, and the PHY layer 34 configures a DLPDU for each frame and transmits the configured DLPDU to the sink device.

The DLPDU includes preamble, CES, a header interval including a basic header and an extended header (EH), IQ interval, and an interval for transmitting data/control bitstreams. The echo message included in the MAC message can be transmitted from a data field that transmits data/control bitstreams of the DLPDU. In this case, the echo message is included in the control bitstreams.

Referring to FIG. 9, data/control bitstreams and test bitstreams, which are not encoded, and audio bitstreams and video coarse bitstreams, which are encoded, are multiplexed into one bitstream by the bitstream MUX 73. Namely, the MAC message that includes the echo request command is included in the control bitstreams, multiplexed with other data streams by the WHDI PHY layer, and encrypted by the coarse stream encryptor 74. Afterwards, the MAC message is transmitted to the sink device through the transmitting antenna after going through the signal transmitting process described with reference to FIG. 9.

Meanwhile, when the source device transmits the MAC message to the sink device through the downlink, the source device can transmit the MAC message through the data field of the aforementioned DLPDU or using the extended header.

FIG. 29 is a diagram illustrating an example of transmission of an echo request command included in a MAC message from a source device to a sink device through a DLPDU, wherein the echo message is included in an extended header (EH).

The echo request command included in the extended header (EH) of the DLPDU is transmitted to the sink device through multiplexing, encryption, and modulation in the WHDI PHY layer together with other bitstreams as illustrated in FIG. 9.

The sink device which has received the echo request command from the source device through the DLPDU can transmit a response message to the echo request command to the source device. At this time, the sink device transmits the echo report command to the source device through the ULCPDU of the uplink. To this end, the echo response message is generated by the AVCL 32 of the sink device. The generated echo response message is included in a part of the MAC message by the MAC layer 33 as described above. Then, the echo response message is transmitted to the source device through the ULCPDU on the PHY layer 34 (S202).

The echo report command generated by the AVCL 32 includes transmitting device address, receiving device address, AVCL_Opcode, and identifier. At this time, the host controller of the sink device selects the same identifier as that included in the echo request command, and the echo report command includes the same parameter as that included in the echo request command. As a result, the transmitting device can obtain RTT through message exchange with the receiving device. As illustrated in FIG. 30, the ULCPDU is configured so that the echo report command generated by the AVCL 32 of the sink device is included in the MAC message and then transmitted to the source device.

FIG. 30 is a diagram illustrating an example of transmission of an echo request command included in a MAC message from a sink device to a source device through a ULCPDU.

Referring to FIG. 30, the ULCPDU includes preamble, CES, uplink control header (ULCH), and a data field transmitting data/control bitstreams. The echo report command included in the MAC message is included in the data field transmitting data/control bitstreams of the ULCPDU and then transmitted from the sink device to the active source device or the passive source device. Since transmission through the ULCPDU is based on data having no relation with A/V data, the echo report command is modulated to a radio signal by the bitstream processor 81 without multiplexing with A/V data as illustrated in FIG. 20. The data bitstreams including the modulated echo report command are mapped into OFDM symbols through the OFDM mapper 82, go through the IDFT module 83, are symbolized in a state that preamble is added thereto by the preamble MUX 85, and are transmitted to the source device through the RF module 87.

As described above, in FIG. 28 to FIG. 30, when the transmitting device serves as the source device and the receiving device serves as the sink device in FIG. 26, the DLPDU is used in the step S201 of transmitting the echo request command while the ULCPDU is used in the step S202 of transmitting the echo report command. On the other hand, when the transmitting device serves as the sink device and the receiving device serves as the source device in FIG. 26, the echo request command included in the MAC message is transmitted from the sink device to the source device, wherein the MAC message is configured using the ULCPDU as illustrated in FIG. 30, while the echo report command is transmitted through the DLPDU as illustrated in FIG. 28 or FIG. 29.

Figure 31:
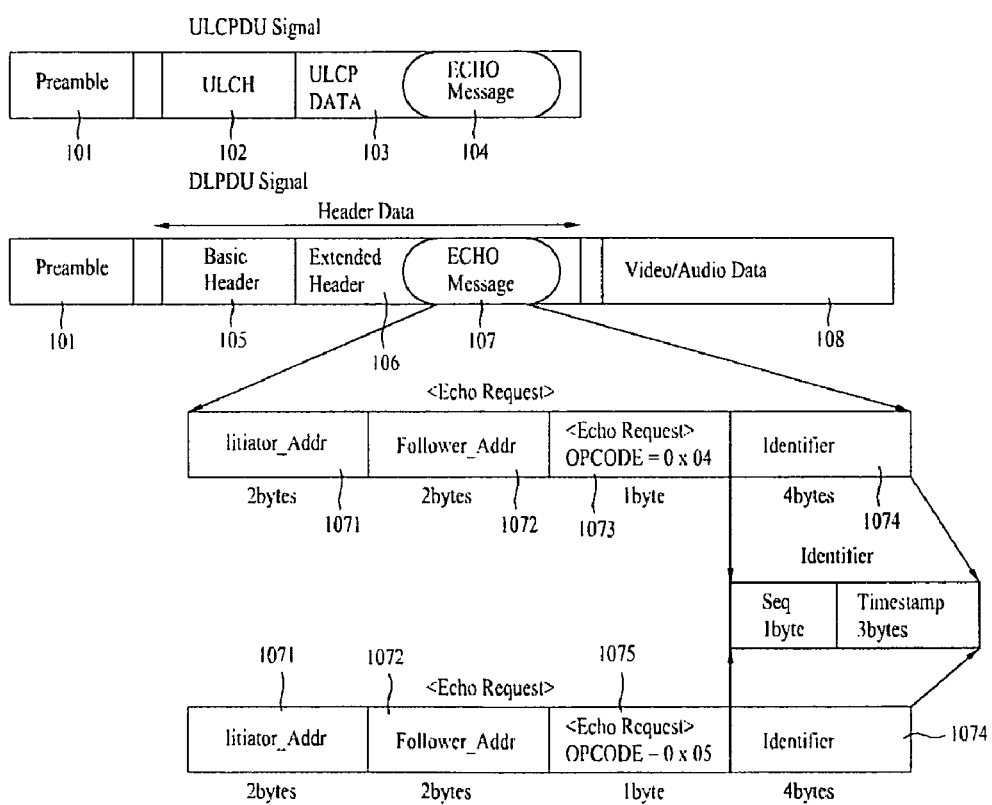
FIG. 31 is a diagram illustrating an example of transmission of a MAC message including an echo request/report message from a source device to a sink device through a DLPDU in accordance with another embodiment of the present invention.

FIG. 31 is a diagram illustrating an example of transmission of a MAC message including an echo request/report message from a WHDI source device to a sink device through a DLPDU in accordance with another embodiment of the present invention.

As illustrated in Table 1, the echo request command or the echo report command includes identifier, such as Timestamp, within the range of random 32 bits. In this case, the identifier included in the echo report command is the same as that included in the echo request command transmitted from the transmitting device.

The DLPDU includes preamble 101, a header interval including a basic header 105 and an extended header (EH) 106, and a data transmission interval 108. The echo message 107 included in the extended header 106 includes a transmitting device address (Initiator_Addr) 1071, a receiving device address (Follower_Addr) 1072, OPCODE 1073, and a bit indicating identifier 1074. One or more devices included in the WHDI network should be identified. Accordingly, in order to match the aforementioned device address system, bits indicating the transmitting device address and the receiving device address should be provided additionally. The 'OPCODE' field 1073 represents a message type, and represents that the AVCL command is an echo request command. 1byte is allocated to the 'OPCODE' field using a code 0x04. All parameters within the limits of 32 bits are used in the identifier field. Examples of the parameters include a current sequence number of the transmitting device and Timestamp, and 4bytes are allocated to these parameters.

Meanwhile, similarly to the echo request command, the echo report command includes a transmitting device address field 1071, a receiving device address field 1072, OPCODE field 1075, and an identifier field 1074. In this case, the 'OPCODE' field 1075 represents that the AVCL command is an echo report command. 1byte is allocated to the 'OPCODE' field using a code 0x05. As described above, the same parameter as that included in the echo request command is used as the identifier included in the echo report command.

Hereinafter, an example of the echo request command that includes a parameter such as a sequence number or Timestamp as an identifier in accordance with one embodiment of the present invention will be described.

The transmitting device intended to transmit a message records its current sequence number therein and increases the same by 1 when sending a data sequence. The transmitting device again records the increased sequence numbers therein. If the sequence number is increased to 255, the transmitting device again starts the sequence number from 0. This is because that the MAC message body field allocated from the MAC message to the sequence has a length of 1~254bytes as illustrated in FIG. 27. The transmitting device can record a value of Timestamp in 4byte together with the sequence number. The value of Timestamp means a value that Clock of the current transmitting device is recorded in a unit of msec.

The receiving device which has received the echo request command transmits the echo report command to the transmitting device so that the transmitting device can calculate RTT. To this end, the receiving device can store the echo request command as Timestamp corresponding to the case where the echo report command is transmitted by copying Timestamp corresponding to the case where the echo request command is received. Also, the receiving device stores the echo request command as sequence corresponding to the case where the echo report command is transmitted by copying sequence corresponding to the case where the echo request command is received. Moreover, the receiving device again transmits the same message to the transmitting device. Afterwards, the transmitting device which has received the echo report command can extract RTT from Timestamp of the echo report command received from its current Clock.

For example, if the transmitting device sends the echo request command of seq=1 and Timestamp=5, the receiving device can transmit the echo report command of seq=1 and Timestamp=5 by copying the echo request command. The transmitting device which has received the echo report command obtains RTT of 95 ms by excluding Timestamp 5 from the current clock when the current clock is 100. Also, if the echo request command of seq=1 is only transmitted, a transmission success rate of 100% is obtained. In other words, if Timestamp is selected as the identifier included in the echo request command, RTT can be obtained. If the sequence number is additionally provided as the identifier, a transmission rate as well as RTT can be obtained.

Figure 32:
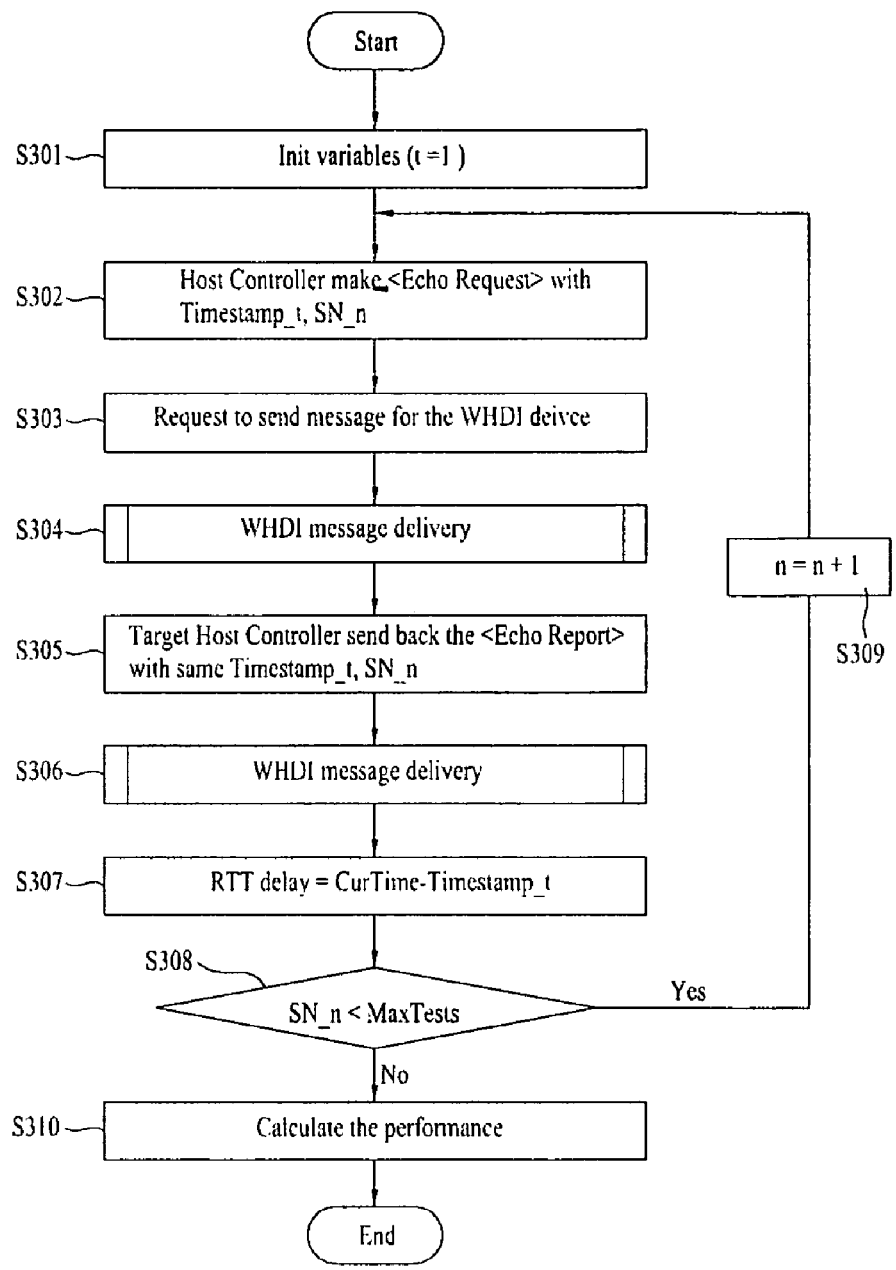
FIG. 32 is a flow chart illustrating a process of transmitting and receiving a radio signal including an echo message between WHDI devices in accordance with one embodiment of the present invention.

FIG. 32 is a flow chart illustrating a process of transmitting and receiving a radio signal including an echo message between WHDI devices in accordance with one embodiment of the present invention. In accordance with the embodiment of the present invention, the parameters, sequence number and Timestamp are selected as the identifiers of the echo request command.

Referring to FIG. 32, the transmitting device performs network measurement to transmit and receive a radio signal in the WHDI. First of all, the transmitting device intended to perform measurement initiates its variables to t=1 and n=1 (S301). In this case, t represents a time of timestamp, and n represents a sequence number. The current time 't' is set to timestamp_t and the number of transmission times 'n' is set to sequence_n, whereby the echo request command is generated (S302). Afterwards, if the host controller of the receiving device requests the WHDI transmitting device to send a message (S303), the transmitting device transmits the echo request command to the receiving device using the DLPDU or the ULCPDU in accordance with a routing rule (S304). The host controller of the receiving device generates the echo report command by copying the identifier parameter 108 of the echo request command (S305), and transmits the echo report command to the transmitting device (S306). Then, the host controller of the transmitting device can obtain RTT delay from the result obtained by subtracting the time of Timestamp from the current time, and stores an average value and an error range until now (S307). The above steps are repeated until the sequence number n of the echo request command reaches the number of times of Max Tests (S308). If the sequence number n is smaller than the number of times Max Tests, the sequence number is increased by one during transmission of next message in step S302 (S309).

If the sequence number n reaches the number of times Max Tests, the steps from S302 to S309 end. Afterwards, the host controller of the transmitting device calculates transmission performance of the corresponding radio path (S310). For example, it is supposed that the average RTT delay is RTT delay millisec, data transmission size that can be requested once is MaxBytes bytes, and the transmission delay time from the transmitter to the receiver in the radio path is almost equal to the transmission delay time from the receiver to the transmitter. In this case, available transmission capacity of control data of the corresponding radio path can be expressed by the following Equation 3.

$$\text{Max Throughput} = \text{Max Bytes} \times 8 \times 1000 \times 2 / \text{RTT Delay (bps)} \quad \text{[Equation 3]}$$

Hereinafter, the process of transmitting a WHDI message will be described with reference to FIG. 33 to FIG. 36.

Figure 33:
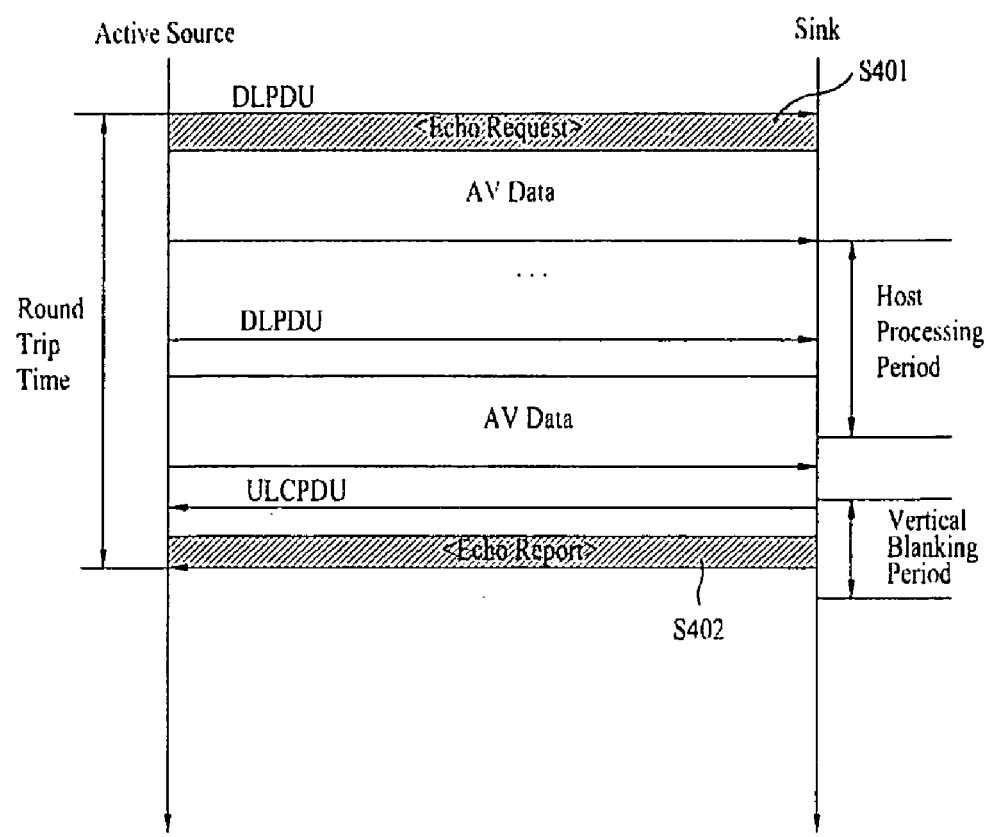
FIG. 33 is a diagram illustrating a process of exchanging an echo message between WHDI devices in accordance with one embodiment of the present invention.

FIG. 33 is a diagram illustrating a process of exchanging an echo message between WHDI devices in accordance with one embodiment of the present invention.

First of all, the active source device transmits the echo request command to the sink device through the DLPDU to measure RTT (S401). For example, if a timer is 50 ms at the time when the source device transmits the echo request command, since Timestamp is a unit of 10 ms, the parameter of Timestamp=5 included in the identifier field 1074 is recorded in the active source device. The active source device transmits the echo request command 107 to the sink device by inserting the same to the data transmission interval or the extended header when the DLPDU signal is generated, as illustrated in FIG. 32. The sink device which has received the echo request command transmits the echo report command to the active source device through the ULCPDU after the host processing time (i.e., processing time of host processor) corresponding to the response time of the host controller that controls the device passes (S402). The response message <Echo Report> is transmitted to the active source device through the ULCPDU transmitted within the vertical blanking period of the video data signal transmission interval originally transmitted from the active source device. When the active source device receives the echo report command, for example, if there is TimeStamp=5, the timestamp is multiplied by TimeUnit=10 ms, whereby a value of timer is recovered as 50 ms. The RTT is obtained using a value obtained by subtracting the recovery value of 50 ms from the current value 70 ms of the timer. Accordingly, the RTT from the time when the active source device transmits the DLPDU including the echo request command to the sink device to the time when the active source device receives the ULCPDU including the echo report command from the sink device is 20 ms.

Figure 34:
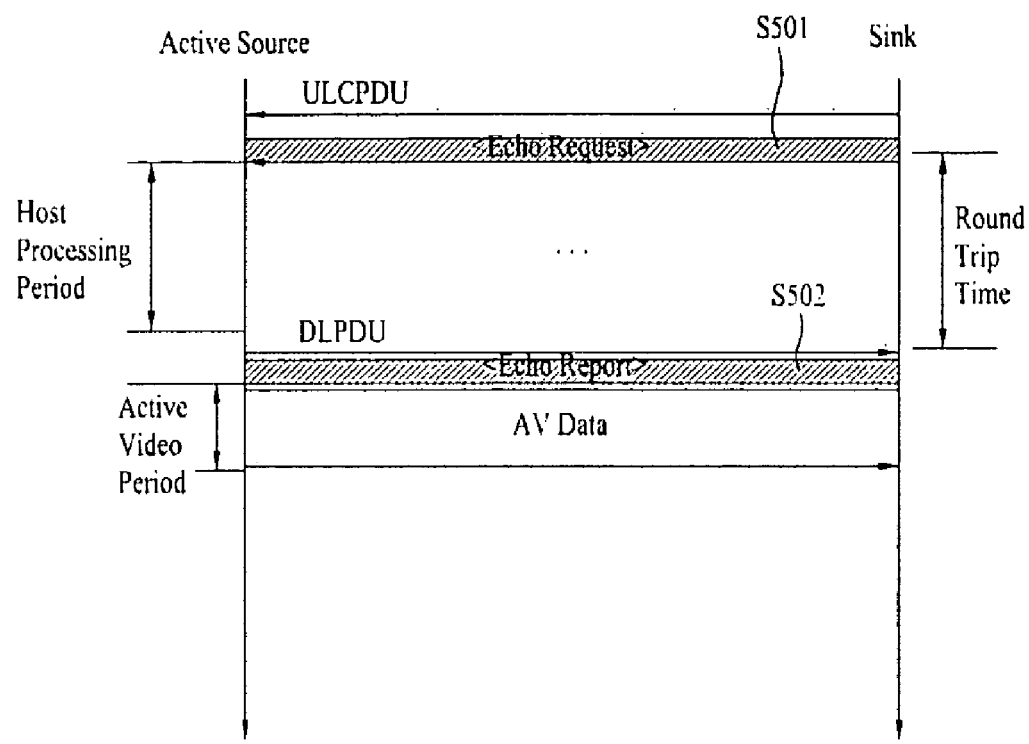
FIG. 34 is a diagram illustrating a process of exchanging an echo message between WHDI devices in accordance with another embodiment of the present invention.

FIG. 34 is a diagram illustrating a process of exchanging an echo message between WHDI devices in accordance with another embodiment of the present invention.

Referring to FIG. 34, the sink device (or passive source device) transmits the ULCPDU to the active source device during signal transmission, wherein the ULCPDU includes the echo request command (S501). The sink device records the current time of its timer in the echo report command as TimeStamp. For example, if the timer indicates 15 ms and TimeUnit is 10 ms, the sink device records the current time as the parameter TimeStamp=1 included in the identifier field 1074. As described above, the echo report command is transmitted by being encapsulated in the ULCPDU data transmitted within the vertical blanking period interval. The active source device which has received the echo report command responds to the active sink device as the echo report command after the host processing time (i.e., processing time of host processor) corresponding to the message processing time (S502). At this time, the echo report command is transmitted by being encapsulated in the A/V data transmission interval of the DLPDU or the extended header. Since the parameter TimeStamp of the echo report command, which is included in the identifier field 1074, is the same as TimeStamp of the echo request command, the sink device recovers the original time, 10 ms, of the timer by multiplying TimeStamp=1 by TimeUnit of 10 ms. Accordingly, an error of 5 ms occurs. If the time of the current timer is 37 ms, for example, 27 ms corresponding to the difference between the current time 37 ms and the recovery time 10 ms becomes RTT.

As described above, the host controller of each device can simply predict the maximum transmission capacity of each radio path using the echo request/report messages. The host controller transmits the message based on the predicted maximum transmission capacity of the radio path, and controls the message transmission interval based on the transmitted message, whereby message loss due to throughput overflow can be reduced.

Figure 35:
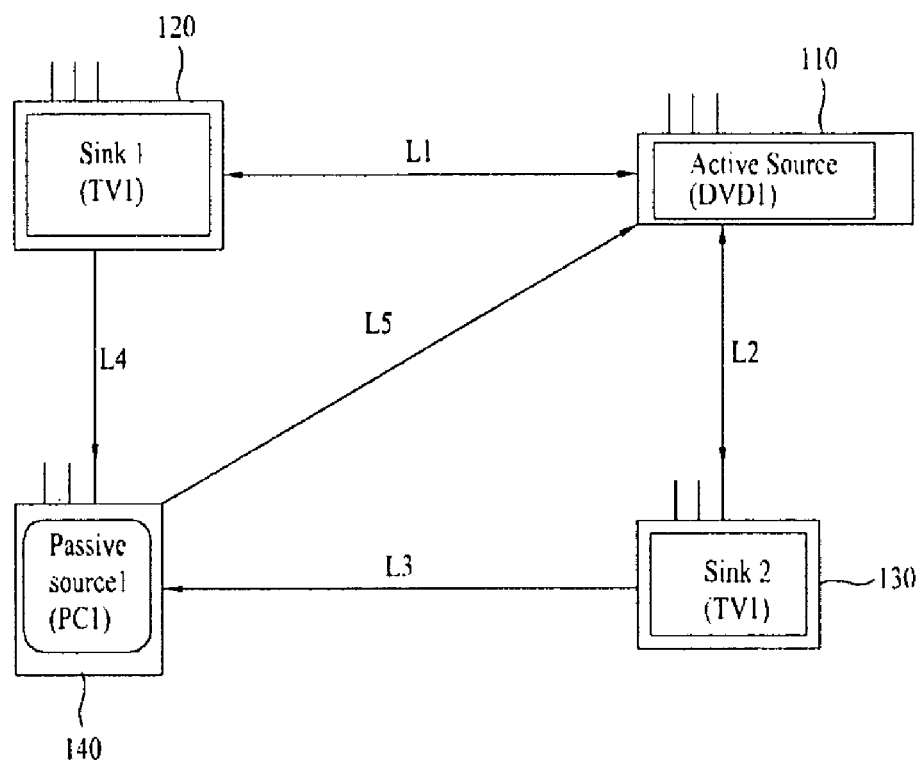
FIG. 35 is a diagram illustrating an example of a configuration of a WHDI network.

FIG. 35 is a diagram illustrating an example of a configuration of a WHDI network.

Referring to FIG. 35, one active source device 110 can broadcast A/V data to sink device 1 120 and sink device 2 130 using the DLPDU. The active source device 110 stores device ID (6bytes) of each device and uses the device ID when transferring a device list to another device.

Meanwhile, the passive source device 140 can receive only uplink signals from the sink device 1 or the sink device 2 and decode them to data. Also, the passive source device 140 can transfer a message to the active source device 110 using the ULCPDU. Accordingly, routing paths of the control message correspond to paths L1, L2, L3, L4 and L5 between respective nodes of the active source device 110, the sink device 1 120, the sink device 2 130, and the passive source device 140.

In this case, the sink device 1 120 can simultaneously transfer 200 vendor specific commands of 20bytes of the AVCL to the active source device 110 and the passive source device 140. In this case, if Max throughput measured in the path L1 is 100 kbps and Max throughput measured in the path L4 is 20 kbps, a transmission interval of the active source device is different from that of the sink device. Namely, messages are transmitted to a Queue_active source device at an interval of 20bytes/100 kbps=1.5 ms while messages are transmitted to a Queue_sink device 1 at an interval of 20bytes/20 kbps=7.8 ms, whereby the 200 messages can be transmitted at a possible fast speed without any error. In this way, as the message transmission queue is varied depending on a maximum transmission rate of each path, the transmission time can be minimized and the transmission success rate can be increased.

Generally, in one WHDI network, the active source device only transmits the DLPDU while most of WHDI source devices fail to decode the DLPDU. Accordingly, if the active source device 110 transmits a control message such as "remote control path through" to the passive source device 140, the control message should be transmitted through a multi-radio path including several radio paths <L1,L4> not L5.

In this case, the routing paths are determined by the transmitting device and the routing device. Referring to FIG. 35, the control message should be transmitted through the sink device 1 120 or the sink device 2 130 when the active source device 110 transmits the control message such as a remote controller key to the passive source device 140. Among the routing paths <L1, L4> through which the sink device 1 can pass and the routing paths <L2, L3> through the sink device 2 can pass, the routing paths having small latency and a small drop rate should be selected to satisfy QoS requested by the user.

As described above, if the echo messages are used in accordance with various embodiments of the present invention, actual measurement values including response time of the host controller can be obtained, and response time in the multi-path between the same devices can be identified more easily. Referring to FIG. 35, signal transmission from the active source device to the passive source device can be performed through two paths. Namely, the first path including <L1, L4, L5> and the second path including <L2, L3, L5> are tested to compare the response time of the first path with that of the second path. At this time, since both the first path and the second path include the path L5, the path of <L1, L4> is actually compared with the path of <L2, L3>.

Accordingly, the RTT result according to echo message exchange between the path of <L1, L4, L5> and the path of <L2, L3, L5> is identified, one of the sink device 1 and the sink device 2 is preferably selected as a via path of the passive source device.

Figure 36:
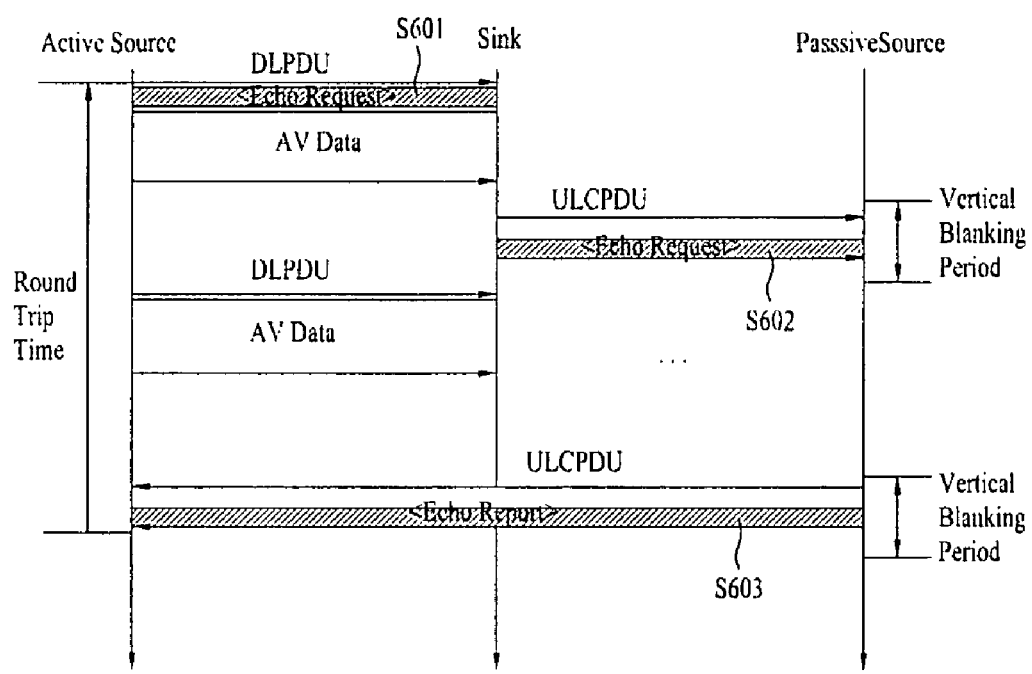
FIG. 36 is a diagram illustrating a process of exchanging an echo message between WHDI devices in accordance with other embodiment of the present invention.

FIG. 36 is a diagram illustrating a process of exchanging an echo message between WHDI devices in accordance with other embodiment of the present invention. As illustrated in FIG. 36, the example of the first path of <L1, L4, L5> that passes through the sink device 1 will be described.

The active source device records its TimeStamp in the DLPDU and transmits the DLPDU to the sink device together with A/V data, wherein the DLPDU includes the echo request command (S601). The sink device 1 which has received the echo request command included in the DLPDU transmits the echo request command to the passive source device using the ULCPDU for the vertical blanking period interval because the receiving address of the echo request command corresponds to the passive source device (S602). The passive source device which has received the echo request command generates the echo report command. Afterwards, the passive source device transmits the ULCPDU, which includes the echo report command, to the active source device for the vertical blanking period interval (S603). As a result, the active source device can calculate the RTT on the first path of <L1, L4, L5>.

For more reliable test result, the active source device performs a path test for the first path of <L1, L4, L5> and the second path of <L2, L3, L5> more than once to extract an average time of RTT delay according to the path test and a response rate of the echo report command. The response rate of the echo report command can be expressed by N-t/N for response equivalent to N-t after the path test is performed N times. Performance of the path can be expressed by Equation 4.

$$M<\text{path}>=W_d \times \text{Delay} + W_e \times \text{ErrorRate} \quad \text{[Equation 4]}$$

In this case, M<path> represents performance of the path, Delay is an average of RTT values, and ErrorRate is a value obtained by subtracting a response rate of the echo report command from 1. And, $W_d$ and $W_e$ are weight values for Delay and ErrorRate, respectively. In view of performance based on Delay, $W_d$ is set to have a greater value than $W_e$. In view of performance based on ErrorRate, $W_e$ is set to have a greater value than $W_d$.

In the aforementioned embodiment, if the value of <L1, L4, L5> is smaller than that of <L2, L3, L5> in accordance with the Equation 4, the sink device 1 is selected as a via path between the active source device and the passive source device. In opposite case, the sink device 2 is selected as the via path. In this way, when N sink devices are provided, a path having minimum M<Path> is selected from each of N paths, whereby a message transmission success rate of different kinds of messages can be enhanced and fast response time can be obtained.

The terms herein can be replaced with other terms. For example, "device" can be replaced with user device (or machine), station, etc., and "coordinator" can be replaced with coordinating (control) device, coordinating (or control) station, piconet coordinator, etc. Also, the AVCL command transmitted and received between devices can be used to mean the AVCL message. Namely, the echo request/report messages can be referred to as the echo request/report commands.

Furthermore, although the aforementioned embodiments have been described based on the examples to which technical features of the present invention are applied to WVAN, the technical features of the present invention may be applied to a peer-to-peer communication system or other wireless network system.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, the signaling process for setting connection between the devices to transmit A/V data in the wireless network can be simplified.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of exchanging messages in a transmitting device to measure a round trip time between a transmitting device and a receiving device in a wireless network, the method comprising:
    generating an echo request command by an audio video control (AVC) layer and transferring the echo request command to a medium access control (MAC) layer, the echo request command including a first identifier for identifying the transmitting device, a second identifier for identifying the receiving device, and a third identifier;
    transferring a MAC message from the MAC layer to a physical layer, the MAC message including a message preamble, a message type, and the echo request command;
    transmitting a first physical layer data unit from the physical layer to the receiving device, the first physical layer data unit including at least one header, the MAC message, and audio/video (A/V) data; and
    receiving a second physical layer data unit from the receiving device, the second physical layer data unit including an echo report command in response to the echo request command, the echo report command including the third identifier,
    wherein the first physical layer data unit is a downlink physical layer data unit (DLPDU), and the second physical layer data unit is an uplink control physical layer data unit (ULCPDU).

2. The method of claim 1, wherein the MAC message is multiplexed with the A/V data to be included in the first physical layer data unit in the physical layer.

3. The method of claim 1, wherein the at least one header includes a basic header and an extended header, and wherein the MAC message is included in the extended header.

4. The method of claim 1, wherein the MAC message includes a cyclic redundancy check (CRC) code added from the MAC layer to perform an error detection at the receiving device.

5. The method of claim 1, wherein the message type included in the MAC message indicates that the echo request command is an AVC command.

6. The method of claim 1, wherein the at least one header included in the first physical layer data unit includes time information for synchronization and a list of devices constituting the wireless network.

7. The method of claim 1, wherein the first physical layer data unit is transmitted for a time period including a first time period for which the MAC message and the at least one header are transmitted and a second time period for which the A/V data are transmitted.

8. The method of claim 7, wherein the second physical layer data unit is transmitted for the first time period.

9. A transmitting device for use in a wireless network, the transmitting device comprising:
   an AVC layer generating an echo request command including a first identifier for identifying the transmitting device, a second identifier for identifying the receiving device, and a third identifier;
   a MAC layer generating a MAC message including a message preamble, a message type, and the echo request command transferred from the AVC layer; and
   a physical layer generating a first physical layer data unit and transmitting the same to a receiving device, and receiving a second physical layer data unit from the receiving device, the first physical layer data unit including at least one header, the MAC message, and audio/video (A/V) data and, and the second physical layer data unit including an echo report command in response to the echo request command, the echo report command including the third identifier,
   wherein the first physical layer data unit is a downlink physical layer data unit (DLPDU), and the second physical layer data unit is an uplink control physical layer data unit (ULCPDU).

10. The transmitting device of claim 9, wherein the physical layer multiplexes the MAC message with the A/V data.

11. The transmitting device of claim 9, wherein the at least one header includes a basic header and an extended header, and wherein the MAC message is included in the extended header.

12. The transmitting device of claim 9, wherein a cyclic redundancy check (CRC) code is added to the MAC message at the MAC layer for the receiving device to perform error detection.

13. The transmitting device of claim 9, wherein the message type included in the MAC message indicates that the echo request command is an AVC command.

14. The transmitting device of claim 9, wherein the at least one header included in the first physical layer data unit includes time information for synchronization and a list of devices constituting the wireless network.

15. A transmitting device for use in a wireless network, the transmitting device comprising:
   a receiving module receiving a broadcasting signal;
   a decoding module decoding the broadcasting signal received by the receiving module;
   a display module displaying contents according to the broadcasting signal decoded by the decoding module;
   a network control module generating a first physical layer data unit including a MAC message and transmitting the same to a receiving device, the MAC message including the broadcasting signal received by the receiving module, a message preamble, a message type, and an echo request command, and receiving a second physical layer data unit including an echo report command from the receiving device in response to the echo request command and processing the same; and
   a control module controlling the transmitting device to measure a round trip time between the transmitting device and the receiving device through exchange of the echo request and report commands, store the broadcasting signal received by the receiving module in a local memory device, or play contents stored in the local memory device, the exchange being performed through the network control module.

16. The transmitting device of claim 15, wherein the echo request command includes a first identifier for identifying the transmitting device, a second identifier for identifying the receiving device, and a third identifier.

* * * * *